United States Patent [19]

Hattori et al.

[11] Patent Number: 5,453,773
[45] Date of Patent: Sep. 26, 1995

[54] ELECTROPHOTOGRAPHIC IMAGE FORMING APPARATUS COMPRISING MEANS FOR AUTOMATICALLY ADJUSTING IMAGE REPRODUCTION DENSITY

[75] Inventors: Yoshihiro Hattori, Toyokawa; Kazuyuki Fukui, Toyohashi; Takanobu Yamada, Toyokawa; Yoshikazu Naito, Gamagori, all of Japan

[73] Assignee: Minolta Camera Kabushiki Kaisha, Osaka, Japan

[21] Appl. No.: 799,609

[22] Filed: Nov. 27, 1991

[30] Foreign Application Priority Data

Nov. 30, 1990 [JP] Japan .................................. 2-337549
Nov. 30, 1990 [JP] Japan .................................. 2-337550
Dec. 10, 1990 [JP] Japan .................................. 2-401098

[51] Int. Cl.$^6$ .......................... G01D 15/14; H04N 1/21
[52] U.S. Cl. .................... 347/129; 347/131; 347/132; 347/246; 347/251; 347/253; 358/298
[58] Field of Search .................. 358/80, 360, 519, 358/521, 298, 455, 458; 355/208; 346/107 R, 108, 160; 347/129, 131, 132, 246, 251, 253

[56] References Cited

U.S. PATENT DOCUMENTS

| | | | |
|---|---|---|---|
| 4,226,525 | 10/1980 | Sakamoto et al. | 355/14 D |
| 4,277,162 | 7/1981 | Kasahara et al. | 355/14 R |
| 4,800,442 | 1/1989 | Riseman et al. | 358/298 X |
| 4,864,419 | 9/1989 | Saito et al. | 358/300 |
| 4,873,428 | 10/1989 | Takeuchi et al. | 346/108 |
| 4,874,428 | 10/1989 | Takeuchi et al. | 250/214 D |
| 4,879,577 | 11/1989 | Mabrouk et al. | 355/208 |
| 4,989,039 | 1/1991 | Hayashi et al. | 355/208 |
| 5,128,699 | 7/1992 | Nakajima et al. | 346/160 |
| 5,153,609 | 10/1992 | Ando et al. | 346/108 |
| 5,189,441 | 2/1993 | Fukui et al. | 346/160 |
| 5,206,686 | 4/1993 | Fukui et al. | 355/208 |
| 5,212,560 | 5/1993 | Hattori et al. | 358/300 |
| 5,250,959 | 10/1993 | Yamada et al. | 346/108 |
| 5,281,979 | 1/1994 | Krogstad | 346/108 |
| 5,298,944 | 3/1994 | Sawayama et al. | 355/208 |
| 5,303,006 | 4/1994 | Mizude | 355/208 |
| 5,309,177 | 5/1994 | Shoji et al. | 346/108 |

FOREIGN PATENT DOCUMENTS 1-196347  8/1989  Japan .

Primary Examiner—Peter S. Wong
Assistant Examiner—Randy W. Gibson
Attorney, Agent, or Firm—Burns, Doane, Swecker & Mathis

[57] ABSTRACT

In an electrophotographic image forming apparatus including a charger for electrically charging the photoconductor to a predetermined initial electric potential, a laser projects a light onto the photoconductor so as to form an electrostatic latent image thereon, and a developing device develops the latent image with toner so as to form a toner image thereon. Further, a charger controller controls the charger based on a detection result of a detector for detecting a state of the photoconductor so that the initial electric potential of the photoconductor changes in a predetermined range, and a selection controller selects one of the plurality of gradation correction data stored in a storage unit based on the detection result of the detector when the initial electric potential of the photoconductor is an upper or lower limit value of the predetermined range. Moreover, a light projecting controller controls the laser to change a light amount of the light projected, based on the gradation correction data selected by the selection controller, according to an image density signal for representing densities of respective pixels of an image to be formed.

35 Claims, 29 Drawing Sheets

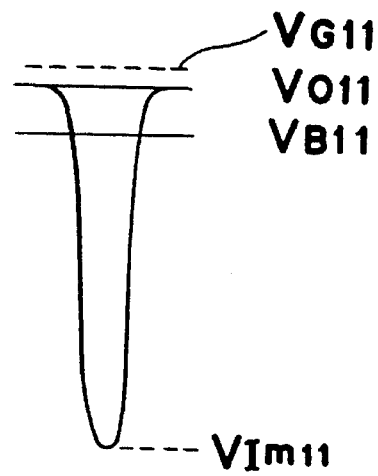
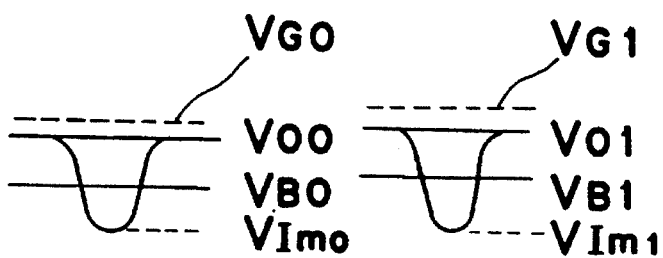
Fig. 13a  Fig. 13b  Fig. 13c
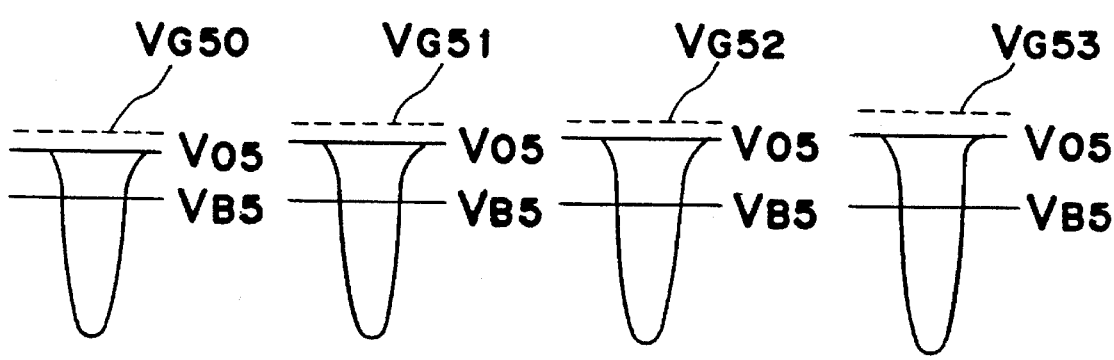
Fig. 14a  Fig. 14b  Fig. 14c  Fig. 14d

ELECTROPHOTOGRAPHIC IMAGE FORMING APPARATUS COMPRISING MEANS FOR AUTOMATICALLY ADJUSTING IMAGE REPRODUCTION DENSITY

BACKGROUND OF THE INVENTION

1. Field of the Invention

The present invention relates to an electrophotographic image forming apparatus, and more particularly, to an electrophotographic image forming apparatus, such as an electrophotographic copying apparatus, an electrophotographic printer, comprising means for automatically adjusting an image reproduction density so as to always obtain a stable gradation reproducibility.

2. Description of the Related Art

Conventionally, there have been put into practical use various kinds of electrophotographic digital image forming apparatuses such as a laser printer, each using an electrophotographic process of reversal development type for driving a laser diode based on digital image data of an image of an original and reproducing the image of the original on a sheet of printing paper. Further, there have been proposed various kinds of digital image forming methods for faithfully reproducing a half-tone image such as a photograph.

As the digital image forming methods of these type, there have been known to those skilled in the art, an area gradation method using a dither matrix, and multi-value laser exposure methods such as a pulse width modulation method for representing a gradation of one dot image to be printed by changing a pulse width or an emitting time of a beam of laser light so as to change a light amount thereof defined as a product of the emitting time and an emitting intensity, and an intensity modulation method for representing a gradation of one dot image to be printed by changing an emitting intensity of a beam of laser light so as to change a light amount thereof (See Japanese Patent Laid-open Publication Nos. 62-91077, 62-39972, 62-188562 and 61-22597). Further, there has been publicly known a multi-value dither method which is a combination of the dither method and the above-mentioned pulse width modulation method or the above-mentioned intensity modulation method.

In the gradation method of this type for representing a gradation, it is considered possible in principle to reproduce an image density having a gradation strictly corresponding to a gradation of image data to be reproduced, however, an actually reproduced image density (referred to as an image reproduction density hereinafter) is not correctly proportional to an original density to be reproduced because of a complicated combination of characteristics of a photoconductor and toners and circumstances etc. In other words, a relationship between the image reproduction density and the original density is shifted from a linear characteristic curve to be originally obtained. Such shifted characteristic as described above is generally called a $\gamma$ characteristic, which mainly causes deterioration of faithfulness of reproduced images of originals, particularly a half-tone original.

Therefore, in order to improve faithfulness of a reproduced image, conventionally, there has been performed a so-called $\gamma$ correction process for converting data of a read original density into data using a predetermined $\gamma$ correction table and forming a digital image of dot images based on the converted data of the original density so that the relationship between the original density and the image reproduction density becomes linear. Thus, normally, the image of the original can be faithfully reproduced depending on the original density by performing the above-mentioned the $\gamma$ correction process.

On the other hand, as one of phenomena due to another cause for influencing the image reproduction density, there is known such a phenomenon that an adhering toner amount onto the photoconductor changes upon a developing process using the toner when characteristics of the photoconductor and the toner change due to change in external circumstances such as the temperature, the humidity, etc. Generally speaking, the adhering toner amount increases under circumstances of a high temperature and a high humidity so that the original image having a higher image reproduction density is reproduced with a $\gamma$ characteristic having a relatively large gradient in a relatively high original density. On the other hand, the adhering toner amount decreases under circumstances of a low temperature and a low humidity so that the original image having a lower image reproduction density is reproduced with a $\gamma$ characteristic having a relatively small gradient in relatively low and middle original densities.

Thus, there is such a problem that the reproduced image density changes due to change in the circumstances. In order to solve the above-mentioned problem so as to obtain a stable proper image reproduction density, there has been performed an image density control process for controlling the maximum image reproduction density to be constant, generally, in a conventional electrophotographic copying apparatus, a conventional electrophotographic printer, or the like.

One of the above-mentioned image density control processes which have been put into practical use will be described below with reference to FIG. 5 for illustrating an image forming part comprising a photoconductive drum 41 and a developing roller 45r.

Referring to FIG. 5, a corona charger 43 having a discharging electric potential $V_C$ is provided so as to confront a photoconductive drum 41. A negative grid voltage $V_G$ is applied to a grid of the corona charger 43 by a grid voltage $V_G$ generator 243. Since it is considered that a surface electric potential Vo on the surface of the photoconductive drum 41 immediately after electrically charging the photoconductive drum 41 by the corona charger 43 and prior to an exposure of a beam of laser light is approximately equal to the grid voltage $V_G$, the surface electric potential Vo on the photoconductive drum 41 can be controlled by changing the grid voltage $V_G$. Further, the surface electric potential Vo immediately after electrically charging it and prior to the exposure of a beam of laser light is detected by a Vo sensor 44 of a surface electrometer. It is to be noted that the surface electric potential on the photoconductive drum 41 becomes the above-mentioned surface electric potential Vo, when an exposure level EXL of a beam of laser light (referred to as an exposure level hereinafter) is a minimum value thereof (zero in the present preferred embodiment) even after the exposure of a beam of laser light.

In the first place, prior to the exposure of a beam of laser light, a negative surface electric potential Vo is set on the photoconductive drum 41 by the corona charger 43 thereby supplying an amount of electric charge corresponding to the surface electric potential Vo thereto, and then, a negative developing bias voltage $V_B$ (|Vo|> |$V_B$|) of a relatively low electric potential is applied to the developing roller 45r by a developing bias voltage $V_B$ generator 244. In this case, the surface electric potential of a developing sleeve of the developing device 45r is also set to the developing bias voltage $V_B$.

Upon the exposure of a beam of light, an electric potential at an exposed position on the photoconductive drum 41 is lowered so as to change from the surface electric potential Vo to an attenuated electric potential of an electrostatic latent image or a surface electric potential $V_I$ after the exposure of a beam of laser light. The surface electric potential $V_I$ upon a maximum exposure level EXL is referred to as a surface electric potential $V_{Im}$ hereinafter.

When the attenuated surface electric potential $V_I$ becomes lower than the developing bias voltage $V_B$, the toner transported onto the surface of the developing sleeve of the developing device 45r adheres onto the surface of the photoconductive drum 41. In this case, it is necessary to fall a difference between the surface electric potential Vo and the developing bias voltage $V_B$ into a predetermined range, and also the adhering toner amount becomes larger as a developing voltage $\Delta V=|V_B-V_I|$ becomes higher. On the other hand, the attenuated surface electric potential $V_I$ changes depending on the surface electric potential Vo even upon the same exposure level. Accordingly, for example, when the surface electric potential Vo and the developing bias voltage $V_B$ are changed making a difference between the surface electric potential Vo and the developing bias voltage $V_B$ constant, a difference between the developing bias voltage $V_B$ and the surface electric potential $V_I$ changes, and then, the adhering toner amount changes, thereby controlling an image reproduction density of a reproduced image.

According to the image density control process of this type as described above, the maximum image reproduction density is made constant by automatically or manually by an operator's changing the surface electric potential Vo on the photoconductive drum 41 and/or the developing bias voltage $V_B$.

In the automatic image density control process, first of all, a reference toner image of a reference image pattern which becomes a reference for the image density control process is formed on the surface of the photoconductive drum 41, and a light amount of a reflected light from the reference toner image is detected by an automatic image density control sensor (referred to as an AIDC sensor hereinafter) 210 provided in the vicinity of the photoconductive drum 41, thereby measuring an image reproduction density of the reference toner image. Data of the detection value detected by the AIDC sensor 203 are inputted to a printer controller 201, which in turn controls the grid voltage $V_G$ generator 243 and the developing bias voltage $V_B$ generator 244 in accordance with a comparison result between the data of the detection value detected by the AIDC sensor 203 and a predetermined value. The above-mentioned process is repeated until the adhering toner amount becomes the predetermined value.

In this case, in order to prevent any fog from being formed on a background of an image and to prevent carrier included in a developer including two components from adhering onto the photoconductor of the photoconductive drum 41, the image density control process is performed making a difference between the surface electric potential Vo and the developing bias voltage $V_B$ constant, conventionally.

As described above, however, upon performing the image density control process by changing the surface electric potential Vo and the developing bias voltage $V_B$ making the difference between the surface electric potential Vo and the developing bias voltage $V_B$ constant, when the grid voltage $V_G$ for inducing the above-mentioned surface electric potential Vo and the developing bias voltage $V_B$ are set to minimum values of adjustable ranges of the output voltages of the $V_G$ generator 243 and the $V_B$ generator 244, there is caused such a problem (referred to as a first problem hereinafter) that there may be reproduced an image having a maximum image reproduction density higher than a desirable maximum image reproduction density due to change in the photoconductor characteristic of the photoconductive drum 41, change in the circumstances or the like. On the other hand, when the grid voltage $V_G$ and the developing bias voltage $V_B$ are set to maximum values of the adjustable ranges thereof, there is caused such another problem (referred to as a second problem hereinafter) that there may be reproduced an image having a maximum image reproduction density lower than a desirable maximum image reproduction density due to change in the photoconductor characteristic of the photoconductive drum 41, change in the circumstances or the like. Therefore, when the above-mentioned first or second problem is caused, there can not be obtained a desirable gradation characteristic, and there can not be always obtained a reproduced image having a constant gradation reproducibility for an original.

By the way, there is another point to be considered in the automatic image density control process for automatically an image reproduction density by changing the grid voltage $V_G$ and the developing bias voltage $V_B$.

In a digital image forming apparatus, in particular, a digital full color image forming apparatus, it is one of important problems to be solved to remove a fog which may be formed on a background of a paper. Since the fog is formed fundamentally depending on the grid voltage $V_G$ and the developing bias voltage $V_B$, it is necessary to properly control both of the voltages $V_G$ and $V_B$ in order to prevent any fog. Generally speaking, it is known to those skilled in the art that the fog may be formed due to, mainly, deterioration of the photoconductor of the photoconductive drum 41 caused after an endurance limit thereof. Therefore, an image reproduction density is adjusted by changing the grid voltage $V_G$ keeping the surface electric potential Vo so as to be set to that in the initial state, thereby preventing any fog. Further, it is necessary to perform the above-mentioned fog removal process so as not to influence the automatic image density control process.

Furthermore, when a half-tone image is formed, it is necessary to take into consideration an influence to a gradation correction process which is generally called a γ correction process. Generally speaking, a relationship between an original density of a read original image to be reproduced and an image reproduction density of a reproduced image becomes a non-linear γ characteristic. Therefore, it is necessary to previously perform the gradation correction process or the γ correction process for correcting data of an light amount of a beam of laser light to the original density so as to heighten faithfulness of the reproduced image. However, when the grid voltage $V_G$ and the developing bias voltage $V_B$ are changed, the γ characteristic changes at that time. Therefore, there is caused such a problem that the faithfulness of the reproduced image is lowered unless the γ correction process is performed depending on the changed γ characteristic.

SUMMARY OF THE INVENTION

An essential object of the present invention is therefore to provide an electrophotographic image forming apparatus capable of always reproducing an image having a stable gradation reproducibility for an original by correcting change in a γ characteristic due to a result of the above-mentioned image density control process.

Another object of the present invention is to provided an electrophotographic image forming apparatus capable of obtaining a desirable gradation characteristic even though the grid voltage $V_G$ and the developing bias voltage $V_B$ are set to the maximum or minimum values of the adjustable ranges of the output voltages of the $V_G$ generator 243 and the $V_B$ generator 244, thereby stably reproducing an image having a predetermined gradation reproducibility.

A further object of the present invention is to provide an electrophotographic image forming apparatus capable of synthetically performing the automatic image density control process, the gradation correction process and the fog removal process without lowering faithfulness of a reproduced image such as a reproduced half-tone image.

A still further object of the present invention is to provide an electrophotographic image forming apparatus capable of preventing both of any pseudo contour and any fog from being formed in a relatively low density portion, thereby stably reproducing an image having a predetermined gradation reproducibility.

In order to achieve the aforementioned objective, according to one aspect of the present invention, there is provided an electrophotographic image forming apparatus comprising:

a photoconductor;

charger means for electrically charging said photoconductor to a predetermined initial electric potential, thereby supplying an electric charge corresponding to the predetermined initial electric potential thereto;

light projecting means for projecting a light onto said photoconductor electrically charged to the predetermined initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

charger control means for controlling said charger means based on a detection result of said detection means so that the initial electric potential of said photoconductor changes in a predetermined range;

storage means for storing a plurality of gradation correction data;

selection means for selecting one of the plurality of gradation correction data stored by said storage means based on the detection result of said detection means when the initial electric potential of said photoconductor is an upper or lower limit value of the predetermined range; and light projecting control means for controlling said light projecting means to change a light amount of the light projected onto said photoconductor by said light projecting means, based on the gradation correction data selected by said selection means, according to an image density signal for representing densities of respective pixels of an image to be formed.

According to another aspect of the present invention, there is provided an electrophotographic image forming apparatus comprising:

a photoconductor;

charger means for electrically charging said photoconductor to a predetermined initial electric potential, thereby supplying an electric charge corresponding to the predetermined initial electric potential thereto;

light projecting means for projecting a light onto said photoconductor electrically charged to the predetermined initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

developing bias control means for controlling said voltage applying means to change the developing bias voltage in a predetermined range based on a detection result of said detection means;

storage means for storing a plurality of gradation correction data;

selection means for selecting one of the plurality of gradation correction data stored by said storage means based on the detection result of said detection means when the developing bias voltage is an upper or lower limit value of the predetermined range; and light projecting control means for controlling said light projecting means to change a light amount of the light projected from said light projecting means onto said photoconductor, based on the gradation correction data selected by said selection means, according to an image density signal for representing densities of respective pixels of an image to be formed.

According to a further aspect of the present invention, there is provided an electrophotographic image forming apparatus comprising:

a photoconductor;

charger means for electrically charging said photoconductor to a predetermined initial electric potential;

light projecting means for projecting a light onto said photoconductor electrically charged to the predetermined initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

gradation control means for controlling said charger means and said voltage applying means to respectively change the output of said charger means and the developing bias voltage in predetermined ranges based on a detection result of said detection means;

storage means for storing a plurality of gradation correction data;

selection means for selecting one of the plurality of gradation correction data stored by said storage means based on the output of said charger means and the developing bias voltage;

correction means for correcting an image density signal for representing image densities of respective pixels of an image to be formed, based on the gradation correction data selected by said selection means; and light projecting control means for controlling said light projecting means to change a light amount of the light projected onto said photoconductor by said light projecting means, according to the image density signal corrected by said correction means, wherein said selection means selects one of the plurality of gradation correction data stored by said storage means based on a detection result of said detection means when the output of said charger means and the developing bias voltage are respectively set to upper or lower limit values of predetermined ranges thereof.

According to a still further aspect of the present invention, there is provided an electrophotographic image forming apparatus comprising:

a photoconductor;

charger means for electrically charging said photoconductor to a predetermined initial electric potential;

light projecting means for projecting a light onto said photoconductor electrically charged to the predetermined initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

operation means manually operable by an operator for adjusting an image density of an image to be formed;

charger control means for controlling said charger means to change the output of said charger means so as to change the initial electric potential of said photoconductor;

storage means for storing a plurality of gradation correction data;

selection means for selecting one of the plurality of gradation correction data stored by said storage means based on an operation result of said operation means when the output of said charger means is set to an upper or lower limit value of a predetermined adjustable range thereof; and light projecting control means for controlling said light projecting means to change a light amount of the light projected onto said photoconductor by said light projecting means, based on the gradation correction data selected by said selection means, according to an image density signal for representing image densities of respective pixels of the image to be formed.

According to a still more further aspect of the present invention, there is provided an electrophotographic image forming apparatus comprising:

a photoconductor;

charger means for electrically charging said photoconductor to a predetermined initial electric potential;

light projecting means for projecting a light onto said photoconductor electrically charged to the predetermined initial electric potential so as to form an electrostatic latent image on said photoconductor; and light projecting control means for controlling said light projecting means to change a light amount of the light projected onto said photoconductor by said light projecting means, according to an image density signal for representing image densities of respective pixels of the image to be formed, based on gradation correction data for representing a relationship between the light amount of the light projected from said light projecting means onto said photoconductor and the image density signal, said gradation correction data being set so that a value of a ratio of the light amount of the projected light to the image density signal gradually increases from that of a predetermined reproduction start light amount as the projected light amount is changed from the reproduction start light amount to zero, said predetermined reproduction start light amount being the projected light amount in the case of first starting reproducing an image as the projected light amount is increased from zero.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3 is a block diagram of an image signal processor shown in FIG. 2a;

FIGS. 13a to 13c are schematic diagrams showing change in respective electric potentials and voltages on the photoconductive drum depending on a density detection level LBA of an AIDC sensor shown in FIG. 2b in a digital full color copying apparatus of a second preferred embodiment;

FIGS. 14a to 14d are schematic diagrams showing change in respective electric potentials and voltages on the photoconductive drum depending on the density detection level LBA of the AIDC sensor shown in FIG. 2b in the digital full color copying apparatus of the second preferred embodiment;

DETAILED DESCRIPTION OF THE PREFERRED EMBODIMENTS

Preferred embodiments according to the present invention will be described below with reference to the accompanying drawings.

FIRST PREFERRED EMBODIMENT

A digital full color copying apparatus of a first preferred embodiment according to the present invention will be described hereinbelow with reference to the accompanying drawings. The description thereof will be made in an order of the following items;

(a) Structure of Digital full color copying apparatus (b) Processing of Image signal (c) Automatic density control and Gradation correction in Electrophotographic process of reversal development type (d) Controlling flow of printing process The features of the digital full color copying apparatus of the first preferred embodiment according to the present invention using an electrophotographic process of reversal development type for printing an image using an intensity modulation method are as follows. Upon adjusting an image reproduction density by changing a grid voltage $V_G$ of a corona charger 43 and a developing bias voltage $V_B$ of each of developing devices 45a to 45d based on the adhering toner amount measured by the AIDC sensor 210, in the case of a combination of the maximum value of the adjustable range of the grid voltage $V_G$ and the maximum value of the adjustable range of the developing bias voltage $V_B$ or a combination of the minimum value of the adjustable range of the grid voltage $V_G$ and the minimum value of the adjustable range of the developing bias voltage $V_B$, when an image reproduction density corresponding to the adhering toner density of the reference toner image is not fallen in a predetermined density range which can be controlled by the image density control process, data of the γ correction table are altered depending on a density detection level LBA measured based on the above-mentioned adhering toner amount, so as to obtain a desirable gradation characteristic.

(a) Structure of digital full color copying apparatus

Figure 1:
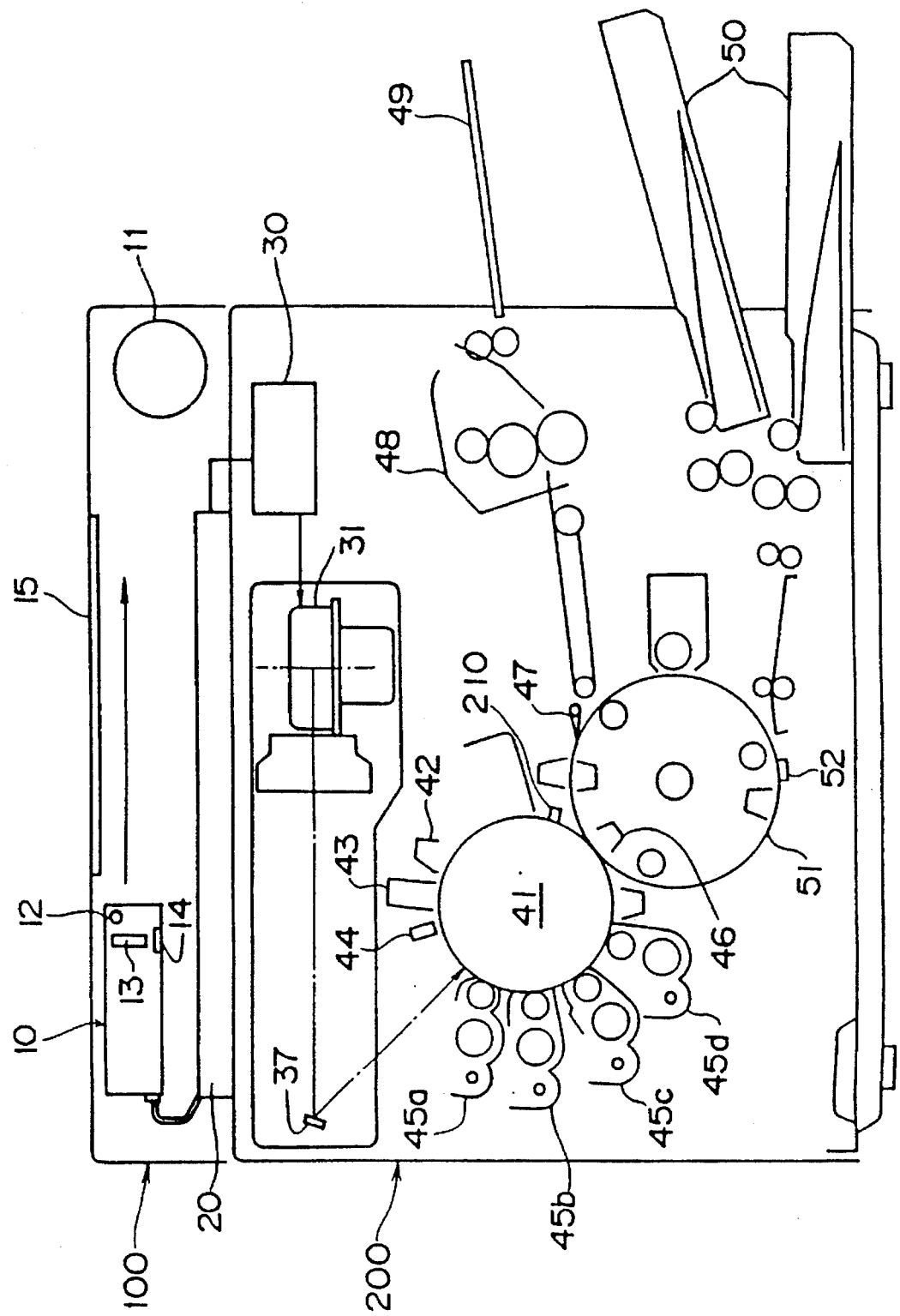
FIG. 1 is a longitudinal cross sectional view showing the whole structure of a digital color copying apparatus of a first preferred embodiment according to the present invention.

FIG. 1 shows the whole structure of the digital full color copying apparatus according to the first preferred embodiment. The digital full color copying apparatus is mainly divided into an image reader part 100 for reading an image of an original (referred to as an original image hereinafter)

and a copying part 200 for reproducing the original image read by the image reader part 100.

A scanner 10 of the image reader part 100 comprises an exposure lamp 12 for illuminating an original placed on a platen 15, a rod lens array 13 for condensing a reflected light from the original, and a contact type CCD color image sensor 14 for converting the condensed reflected light into electric image signals. Upon reading an original image, the scanner 10 is driven by a motor 11 so as to move in a subscan direction as indicated by an arrow, thereby scanning the original image placed on the platen 15. The reflected light from original image illuminated by the exposure lamp 12 is photoelectrically converted into multi-value electric image signals of three colors of red (R), green (G) and blue (B) by the image sensor 14. The multi-value electric image signals of three colors outputted from the image sensor 14 are converted by a read image signal processor 20 into eight bit gradation data of either one of yellow (Y), magenta (M), cyan (C), and black (K). Thereafter, the eight bit gradation data are stored in a buffer memory 30 for synchronization.

Figure 4:
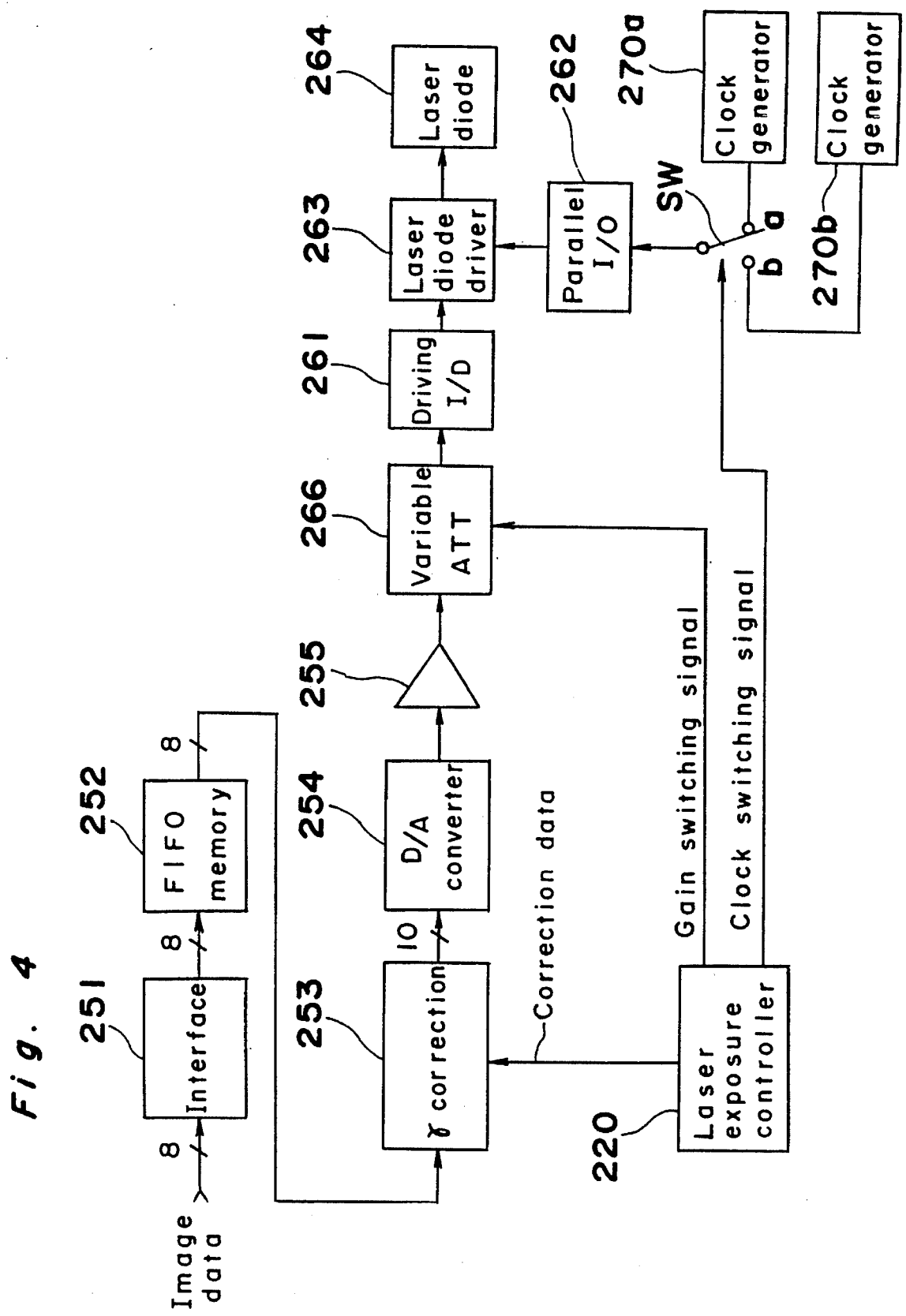
FIG. 4 is a block diagram of an image data processing part of a printer controller shown in FIG. 2b.

Subsequently, in the copying part 200, a print head part 31 carries out a gradation correction process or a γ correction depending on a gradation characteristic of the photoconductive drum 41 for the inputted gradation data, and then, converts the corrected image data into an analogue laser diode driving signal. A semiconductor laser diode 264 shown in FIG. 4 is driven according to the laser diode driving signal.

A beam of laser light emitted from the semiconductor laser diode 264 of the print head part 31 according to the laser diode driving signal is projected through a reflection mirror 37 onto the photoconductive drum 41 rotated. The photoconductive drum 41 is illuminated by an eraser lamp 42 before the exposure of a beam of laser light every copying process, and also is electrically charged uniformly by the corona charger 43. When the photoconductive drum 41 is exposed to a beam of laser light in this state, an electrostatic latent image corresponding to the original image is formed thereon. Only one of the developing devices 45a to 45d respectively including cyan, magenta, yellow and black toners is selected, and the electrostatic latent image formed on the photoconductive drum 41 is developed with toner by the selected one developing device so as to form a toner image thereon. The developed toner image is transferred by a transfer charger 46 onto a sheet of copying paper wound around a transfer drum 51. On the other hand, an adhering toner amount of a reference toner image which is developed after an exposure of a predetermined light amount of a beam of light onto a predetermined area on the photoconductive drum 41 is optically detected by the AIDC sensor 210. In other words, the reference toner image is illuminated so that an illumination light is obliquely incident thereonto, and a reflected light from the reference toner image is detected by the AIDC sensor 210. The above-mentioned adhering toner amount is measured based on the intensity of the reflected light from the reference toner image.

The above-mentioned printing process is repeatedly performed for images of respective colors of yellow (Y), magenta (M), cyan (C) and black (K). At that time, the scanner 10 repeatedly performs the scan operation in synchronization with the rotation of the photoconductive drum 41 and the transfer drum 51. Thereafter, the copying paper is separated from the transfer drum 51 by a separating nail 47, and then, the toner image transferred on the copying paper is fixed by a fixing device 48. Thereafter, the copying paper is discharged onto a paper discharge tray 49. A sheet of copying paper is fed from a paper cassette 50, the end of which is chucked by a chucking mechanism 52 provided on the transfer drum 51, thereby preventing any positional displacement of the copying paper during the transfer process.

Figure 2A:
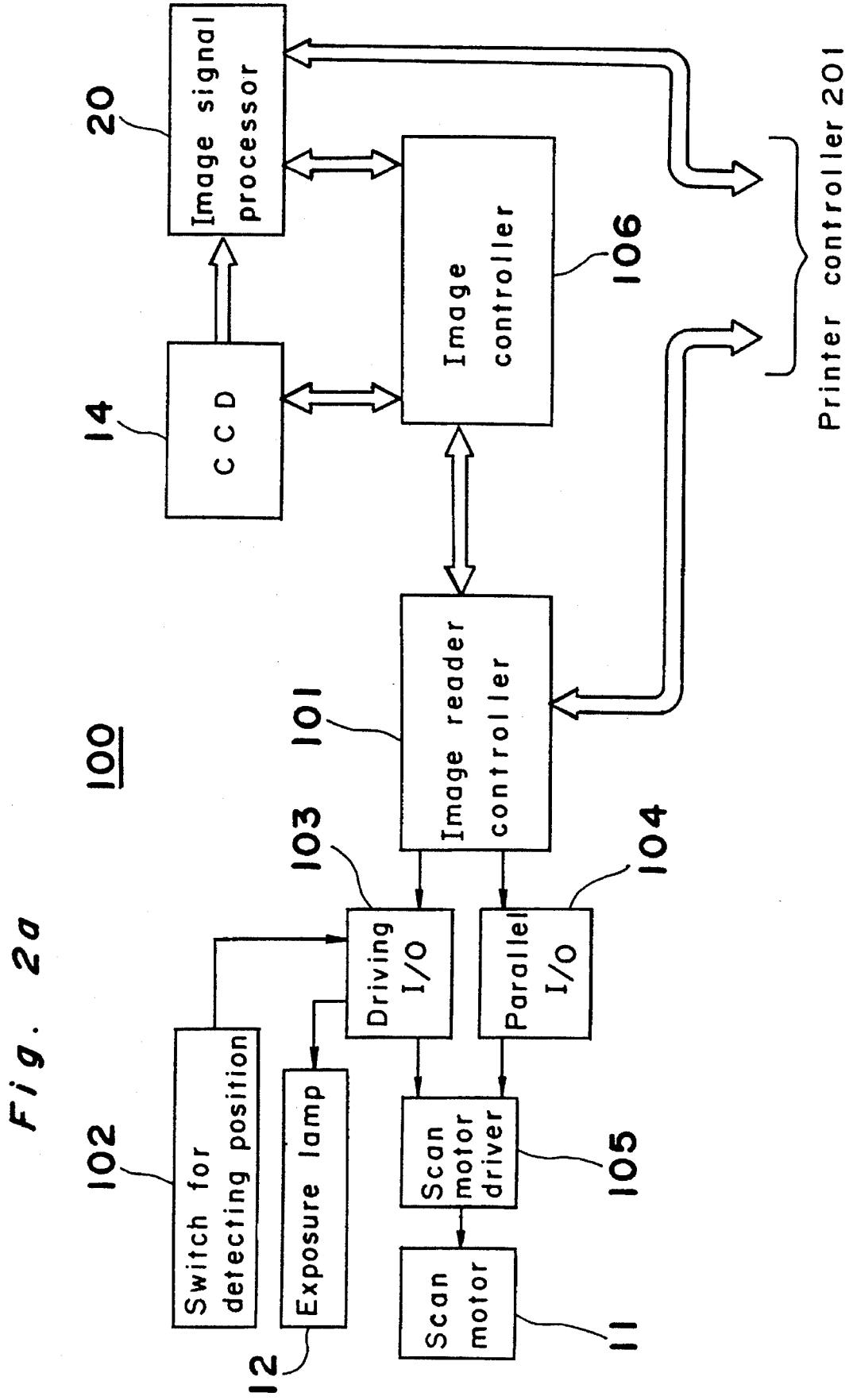
FIGS. 2a and 2b are block diagrams of a controlling part of the digital full color copying apparatus shown in FIG. 1.
Figure 2B:
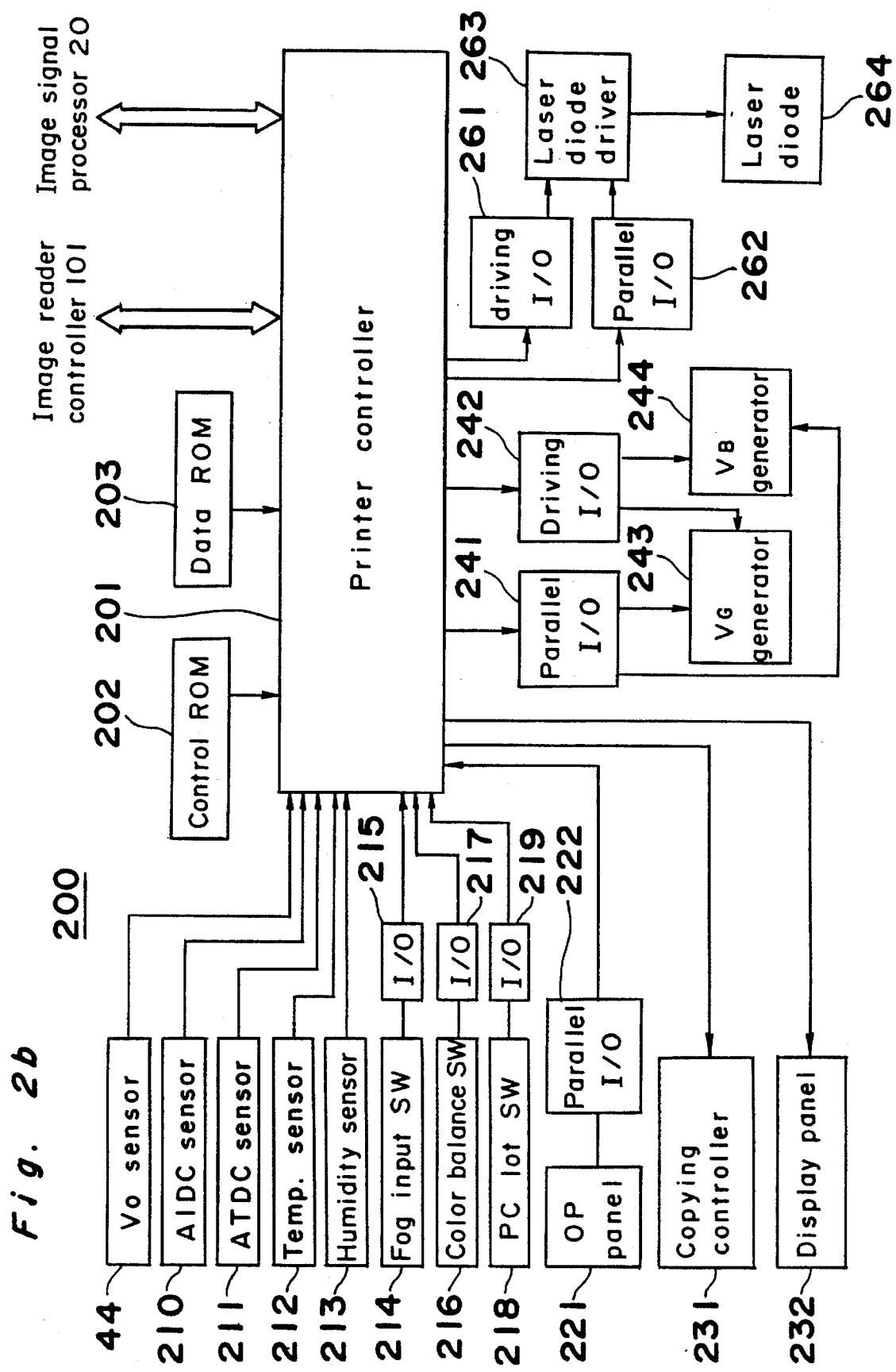

FIGS. 2a and 2b are block diagrams of a controlling part of the digital full color copying apparatus shown in FIG. 1.

Referring to FIG. 2a, the image reader part 100 is controlled by an image reader controller 101. The image reader controller 101 controls the exposure lamp 12 through a driving input and output device (referred to as a driving I/O hereinafter) 103 in accordance with a positional signal outputted from a position detecting switch 102 which detects a position of the original on the platen 15. Moreover, the image reader controller 101 controls a scan motor driver 105 through the driving I/O 103 and a parallel input and output interface circuit (referred to as a parallel I/O hereinafter) 104. A scan motor 11 is rotated by the scan motor driver 105.

On the other hand, the image reader controller 101 is electrically connected to an image controller 106 through a bus. The image controller 106 is electrically connected to not only the CCD color image sensor 14 but also the image signal processor 20 through respective buses. The electric image signals outputted from the CCD color image sensor 14 are inputted to the image signal processor 20 to be processed therein.

Referring to FIG. 2b, the copying part 200 comprises a printer controller 201 for controlling a general copying operation.

The printer controller 201 having a CPU is electrically connected to not only a control ROM 202 for storing a control program but also a data ROM 203 for storing various kinds of data including γ correction data, γ correction tables etc. The printer controller 201 controls the printing operation in accordance with the data stored in these ROMs 202 and 203.

Figure 5:
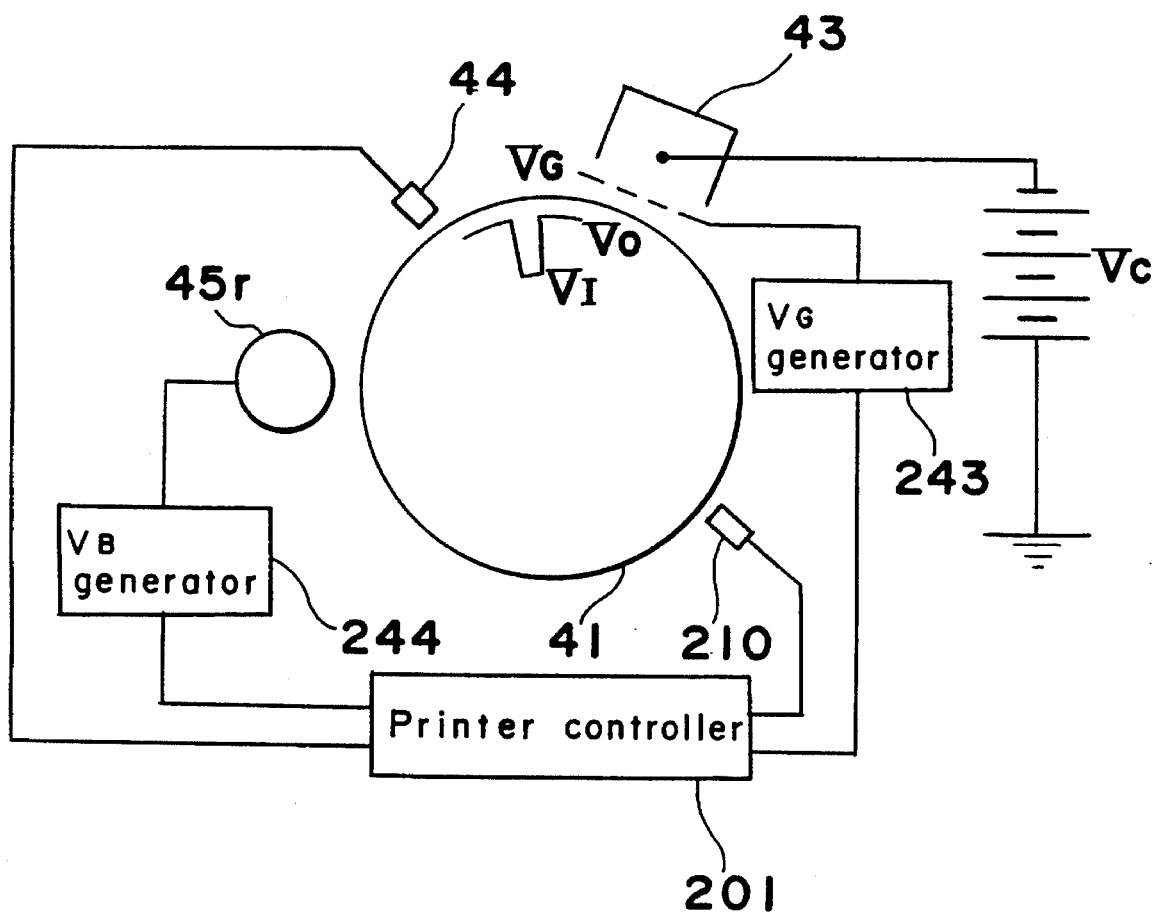
FIG. 5 is a schematic block diagram of devices provided around a photoconductive drum of a conventional copying apparatus.

Analogue signals outputted from the Vo sensor 44 for detecting a surface potential Vo on the photoconductive drum 41, the AIDC sensor 210 for optically detecting the adhering toner amount of the reference toner image adhering onto the surface of the photoconductive drum 41, an ATDC sensor 211 for detecting toner densities of toners of respective colors provided within the respective developing devices 45a to 45d, a temperature sensor 212 and a humidity sensor 213 are inputted to the printer controller 201. The AIDC sensor 210 is provided at such a position between a transfer position and the eraser lamp 42 as shown in FIGS. 1 and 5.

There are provided two bit fog input switches 214 of respective colors cyan (C), magenta (M), yellow (Y) and black (K) each provided for setting a fog removal level in four stapes which is a setting level for removing a fog or a minimum image reproduction density of a low density portion of an image to be formed, four bit color balance switches 216 for setting color balances of the respective colors, and a three bit photoconductor lot switch 218 for correcting a lot dependency of the characteristics of the photoconductive drum 41. The switches 214, 216 and 218 are electrically connected to the printer controller 201, respectively, through input and output interface circuits (referred to as I/O interfaces hereinafter) 215, 217 and 219.

In the present preferred embodiment, the fog removal levels of two bits of the respective colors are set in four steps using the fog input switches 214 of DIP switches by a maintenance man or an operator of a user. However, it may be possible to input the fog removal level using an operation panel 221 through a parallel I/O 222. Moreover, various kinds of data are inputted to the printer controller 201 by manipulation of keys provided on the operation panel 221 through the parallel I/O 222.

The printer controller 201 controls a copying controller 231 and a display panel 232 according to contents of the control program stored in the control ROM 202 based on the data outputted from the sensors 44 and 210 to 213, the operation panel 221, the respective input switches 214, 216 and 218, and the data ROM 203. Moreover, the printer controller 201 controls not only the grid voltage $V_G$ generator 243 for generating a grid voltage $V_G$ of the corona charger 43 but also the developing bias voltage $V_B$ generator 244 for generating a developing bias voltage $V_B$ of each of the developing devices 45a to 45d through a parallel I/O 241 and a driving I/O 242, respectively, in order to perform an automatic image density control process using the AIDC sensor 210 or a manual image density control process by inputting setting data such as the grid voltage $V_G$ and the developing bias voltage $V_B$ using the operation panel 221.

The printer controller 201 is further electrically connected to the image signal processor 20 of the image reader part 100 through an image data bus, and then, the printer controller 201 controls a semiconductor laser driver 263 through a driving I/O 261 and a parallel I/O 262 with referring to the contents of data stored in the data ROM 203 for storing the $\gamma$ correction table on the basis of an image density signal inputted thereto through the image data bus. The semiconductor laser diode 264 is driven by the semiconductor laser driver 263 so as to emit a beam of laser light. The gradation of an image is represented by modulating an emitting intensity of a beam of laser light emitted from the semiconductor laser diode 264.

(b) Processing of image signal

Figure 3:
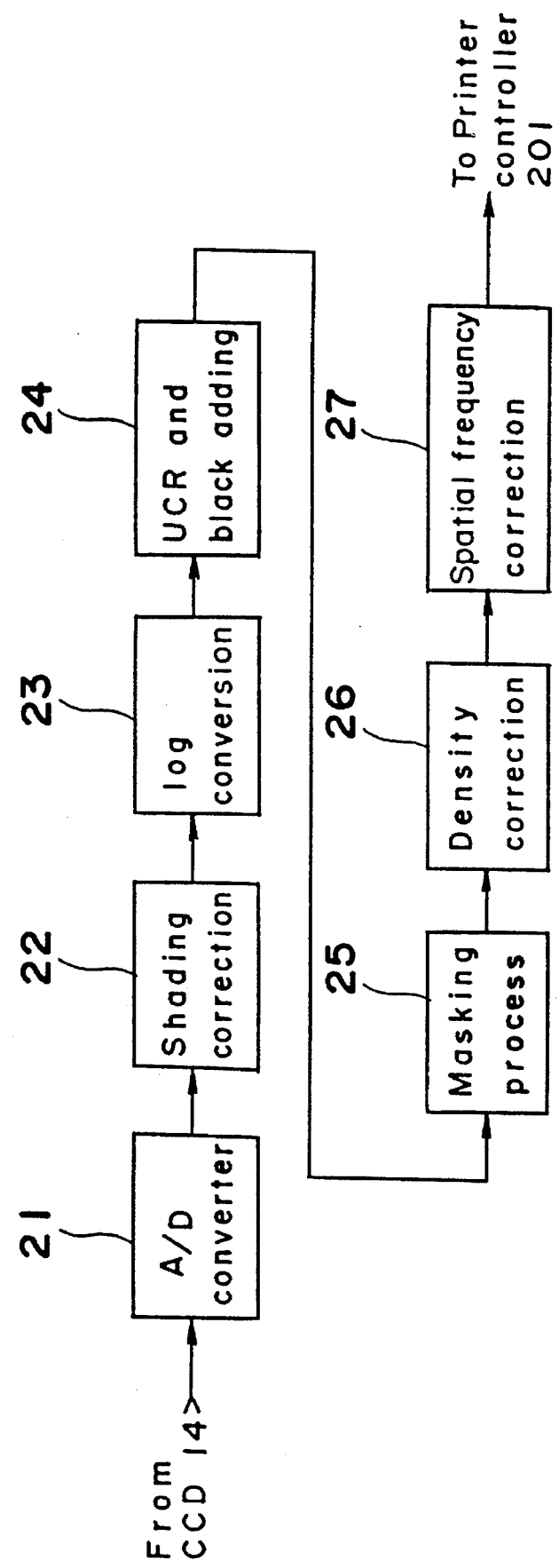

FIG. 3 shows a processing flow of the image signal transmitted from the CCD color image sensor 14 through the image signal processor 20 to the printer controller 201. A process for processing electric image signals and outputting gradation data will be described below with reference to FIG. 3.

In the image signal processor 20, analogue electric image signals which photoelectrically converted by the CCD color image sensor 14 are converted into multi-value digital image data of three colors R, G and B by an analogue to digital converter (referred to as an A/D converter hereinafter) 21. The converted digital image data of respective colors are inputted to a shading correction circuit 22, which performs a shading correction process for the inputted digital image data. Since the image data after completion of the shading correction process are data of the reflected light from the original, the image data thereof are outputted from the shading correction circuit 22 to a logarithmic conversion circuit 23, which performs a logarithmic conversion process for converting the inputted image data into density data of the actual original image. Thereafter, the density data are inputted to an under color removal and black adding circuit (referred to as a UCR and black adding circuit hereinafter) 24, which performs not only an under color removal process for removing unnecessary black components but also a black adding process for generating image data of black based on density data of three colors R, G and B. Further, a masking process circuit 25 converts the density data of three colors R, G and B outputted from the UCR and black adding circuit 24 into density data of three colors of yellow (Y), magenta (M) and cyan (C), and then, a density correction circuit 26 performs a density correction process for respectively multiplying the converted density data of three colors by predetermined coefficients. Thereafter, a spatial frequency correction circuit 27 performs a spatial frequency correction process for the density data after completion of the density correction process, and outputs the processed density data as eight bit image data to the printer controller 201.

FIG. 4 shows an image data processing part of the printer controller 201.

The eight bit image data outputted from the image signal processor 20 are inputted through an interface part 251 to a first in first out memory (referred to as an FIFO memory hereinafter) 252. The FIFO 252 is a line buffer memory for storing gradation data of images of a predetermined number of scan lines in a main scan direction perpendicular to the subscan direction, and is provided to absorb a difference between frequencies of operation clocks of the image reader part 100 and the copying part 200. Image data read out from the FIFO 252 are inputted to a $\gamma$ correction part 253. As described in detail later, the $\gamma$ correction data of the $\gamma$ correction table stored in the data ROM 203 are transferred from a laser exposure controller 220 of the printer controller 201 to the $\gamma$ correction part 253, and then, the $\gamma$ correction part 253 performs a $\gamma$ correction process for the inputted image data based on the transferred $\gamma$ correction data, and outputs digital image data of ten bits after completion of the $\gamma$ correction process to a digital to analogue converter (referred to as a D/A converter hereinafter) 254.

The D/A converter 254 converts the inputted digital image data to an analogue voltage and outputs it to the semiconductor laser diode 264 through an amplifier 255, a variable attenuator 266, the driving I/O 261 and the semiconductor laser driver 263, and then, the semiconductor laser diode 264 emits a beam of laser light with an emitting intensity corresponding to the digital image data. The attenuation amount of the variable attenuator 266 is changed in eight steps in accordance with a gain switching signal outputted from the laser exposure controller 220, thereby changing the power of a beam of laser light emitted from the semiconductor laser diode 264 in eight steps.

Further, clock generators 270a and 270b generate clock signals of clock frequencies different from each other to the semiconductor laser driver 263 through terminals a and b of a switch SW and the parallel I/O 262, respectively. The switch SW is switched over by a clock switching signal outputted from the laser exposure controller 220, and then, the two clock signals are selectively inputted through the parallel I/O 262 to the semiconductor laser driver 263.

Figure 7:
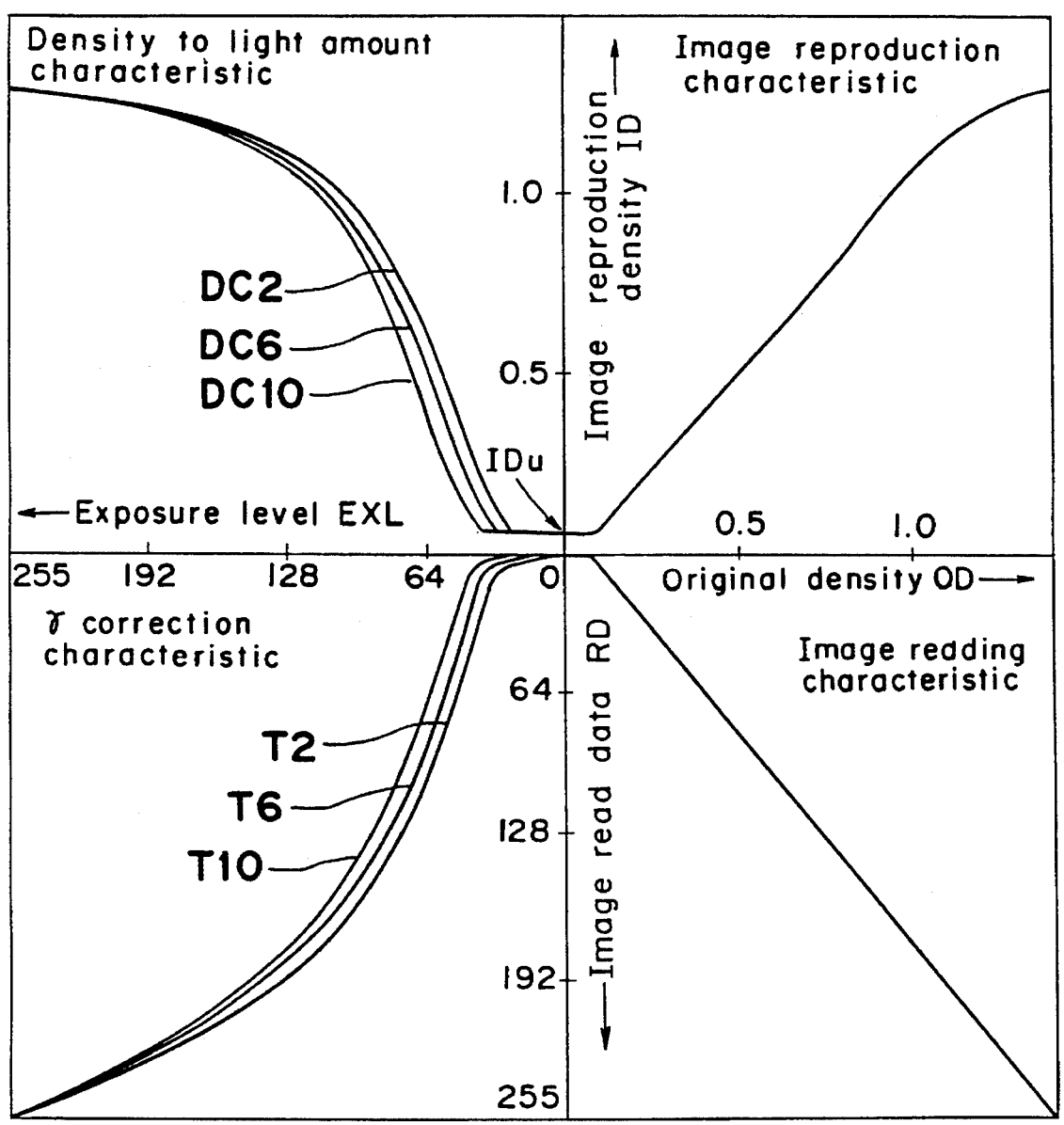
FIG. 7 is a graph of a sensitometry showing an image reproduction density to light amount characteristic, an image reproduction characteristic, a γ correction characteristic and an image read characteristic of a conventional digital full color copying apparatus.

(c) Automatic density control and Gradation correction in Electrophotographic process of reversal development type FIG. 7 is a graph of a sensitometry showing an image reproduction density to light amount characteristic, an image reproduction characteristic, a $\gamma$ correction characteristic and an image read characteristic, of the conventional digital full color copying apparatus described in the above description of the related art, which controls the image reproduction density so that the difference between the surface potential Vo on the photoconductive drum 41 and the developing bias voltage $V_B$ is made constant.

Figure 11:
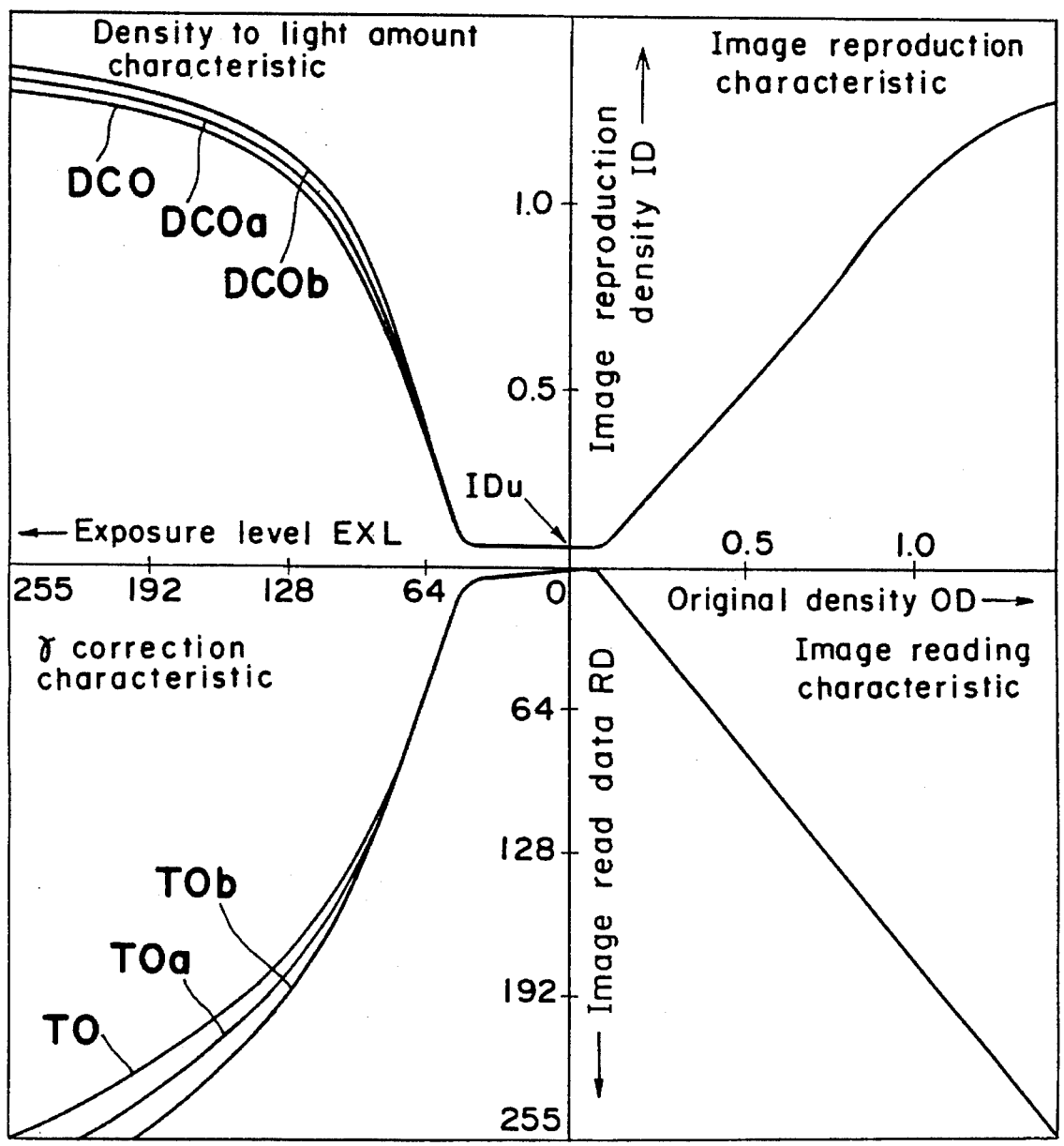
FIG. 11 is a graph of a sensitometry showing an image reproduction density to light amount characteristic, an image reproduction characteristic, a γ correction characteristic and an image read characteristic of the digital full color copying apparatus of the first preferred embodiment in the case of a combination of a minimum grid voltage $V_G$ and a minimum developing bias voltage $V_B$.
Figure 12:
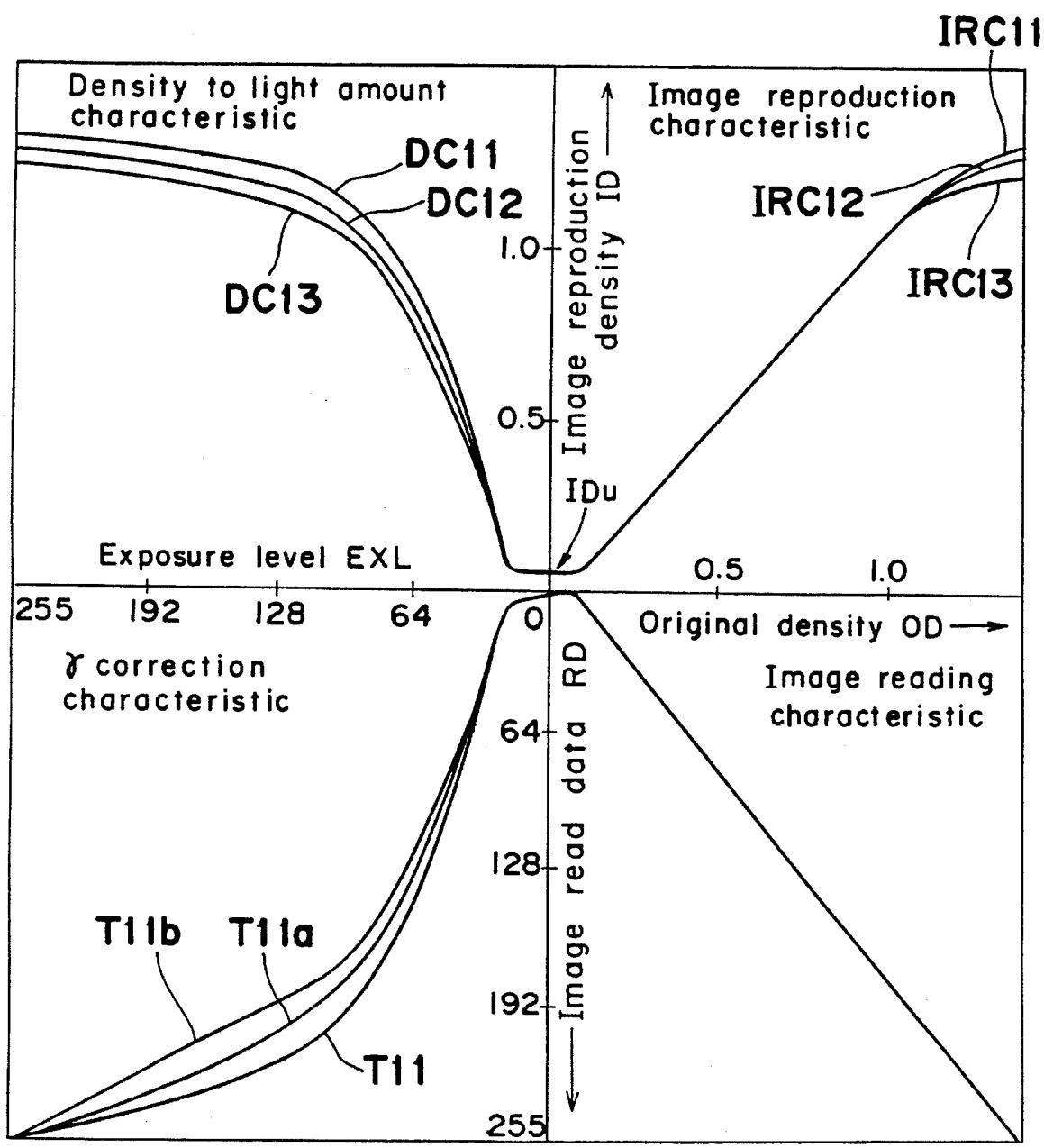
FIG. 12 is a graph of a sensitometry showing an image reproduction density to light amount characteristic, an image reproduction characteristic, a γ correction characteristic and an image read characteristic of the digital full color copying apparatus of the first preferred embodiment in the case of a combination of a maximum grid voltage $V_G$ and a maximum developing bias voltage $V_B$.

In FIGS. 7, 11 and 12, the image reproduction density ID is represented as an absolute density which is the sum of an image density of a printed image and a density of a background of a copying paper on which the image is to be printed, wherein a reflection density is zero in the case of a white plate of calcium carbonate. Therefore, even though an original density is zero, there can be measured an image density IDu of the background of the copying paper.

Further, in the image reproduction density to light amount characteristic shown in FIG. 7, a characteristic curve DC2 is that in applications of a grid voltage $V_g$ of 570 V and a developing bias voltage $V_B$ of 345 V, a characteristic curve DC6 is that in applications of a grid voltage $V_G$ of 700 V and a developing bias voltage $V_B$ of 450 V, and a characteristic curve DC10 is that in applications of a grid voltage $V_G$ of 900 V and a developing bias voltage $V_B$ of 620 V. In this case, γ correction characteristics T2, T6 and T10 can be previously made in a manner similar to those skilled in the art so as to obtain a desirable image reproduction characteristic shown in the first quadrant of the sensitometry shown in FIG. 7, based on the above image reproduction density to light amount characteristics DC2, DC6 and DC10, respectively.

It is to be noted that respective characteristic curves shown in FIG. 7 correspond to the γ correction tables T2, T6 and T10 shown in Table 3 provided in the present preferred embodiment.

Figure 8:
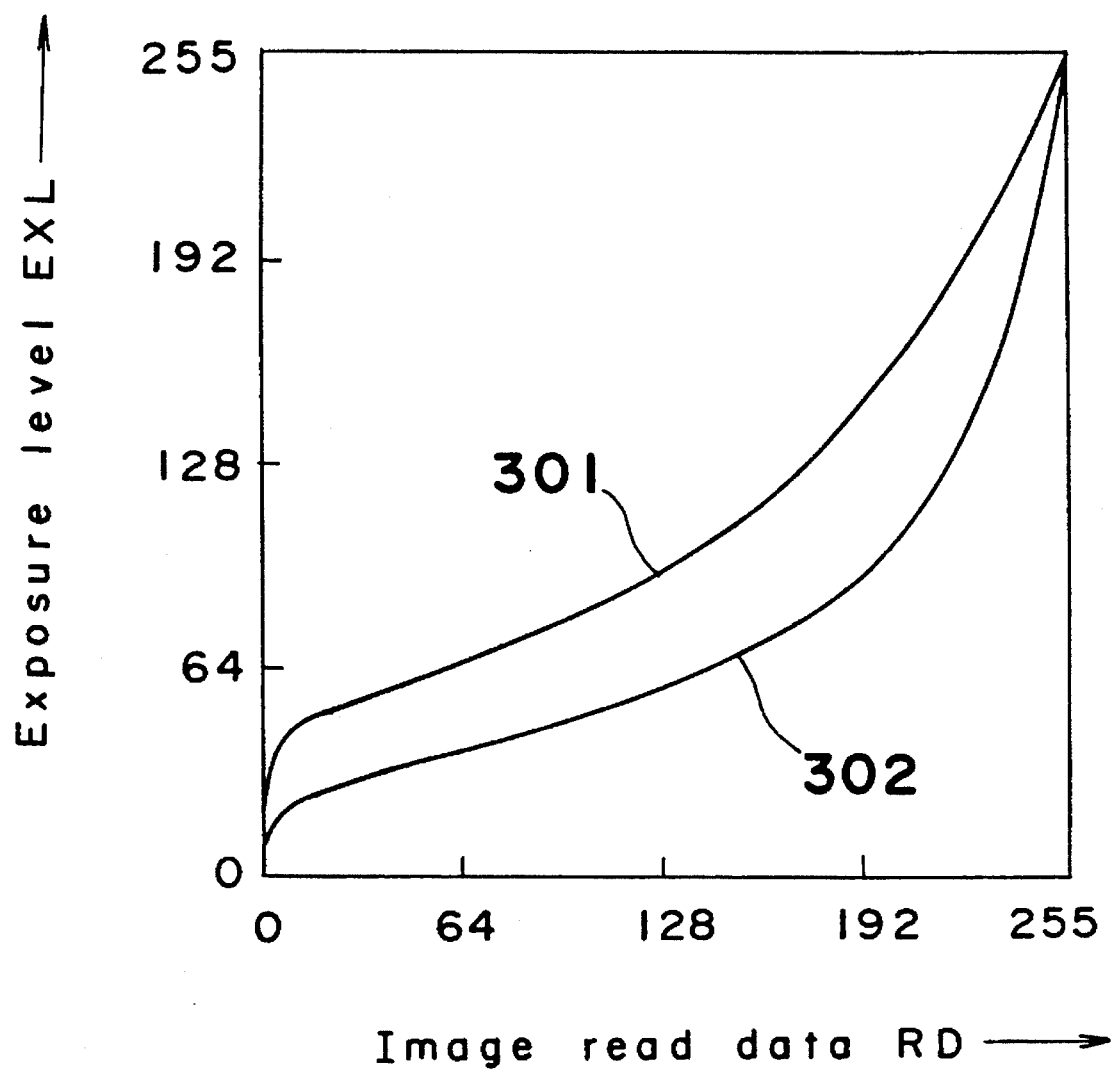
FIG. 8 is a graph of a γ correction characteristic of the conventional digital full color copying apparatus.

FIG. 8 is a graph of a γ correction characteristic of the conventional digital full color copying apparatus. In FIG. 8, a characteristic curve 301 shows a γ correction characteristic in the case of a combination of a relatively low grid voltage $V_G$ and a relatively low developing bias voltage $V_B$, and a characteristic curve 302 shows a γ correction characteristic in the case of a combination of a relatively high grid voltage $V_G$ and a relatively high developing bias voltage $V_B$.

As is apparent from FIG. 8, in the case of the combination of the relatively high grid voltage $V_G$ and the relatively high developing bias voltage $V_B$, the exposure level EXL in a middle density or a half-tone density is set to a relatively lower value as shown in the characteristic curve 302. On the other hand, in the case of the combination of the relatively low grid voltage $V_G$ and the relatively low developing bias voltage $V_B$, the exposure level EXL in a middle density or a half-tone density is set to a relatively larger value as shown in the characteristic curve 301.

By the way, at the adhering toner amount at the maximum light amount, a variable range of a developing efficiency is limited by adjustable ranges of output voltages of output transformers provided in the $V_G$ and $V_B$ generators 243 and 244, wherein the developing efficiency is defined by the following equation:

(Developing efficiency)=(Adhering toner amount)/(Developing voltage $\Delta V$)  (1), where $\Delta V = |V_B - V_f|$  (2).

Figure 9:
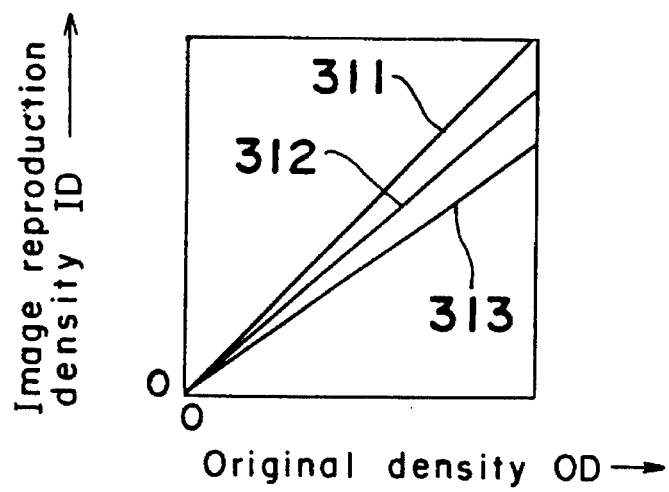
FIG. 9 is a graph of one example of an image reproduction characteristic of the conventional digital full color copying apparatus.
Figure 10A:
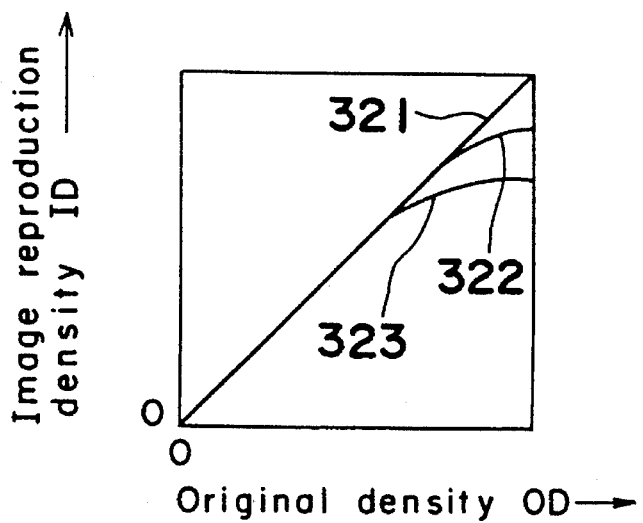
FIG. 10a is a graph of one example of a preferable image reproduction characteristic of a digital full color copying apparatus.
Figure 10B:
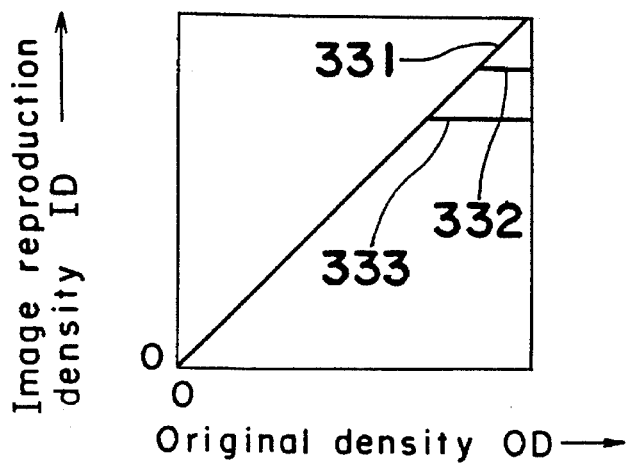
FIG. 10b is a graph of another example of the preferable image reproduction characteristic of the digital full color copying apparatus.

However, data of the γ correction table are changed in a half-tone portion, so that an image having a predetermined gradation can be reproduced in a range of a wider variable width of the developing efficiency. In particular, in the case of the full color copying apparatus, when reading a photograph original which is necessary to obtain a better color reproducibility and converting the read photograph original into image data of respective colors, almost all of the image data thereof are half-tone image data. Therefore, in stead of using image reproduction characteristics 311 to 313 for keeping linear gradation characteristics in a range from white image to black image as shown in FIG. 9, when there are used image reproduction characteristics 321 to 323 and 331 to 333 having relatively large image reproduction densities in a half-tone portion so as to keep the image reproduction densities larger than a predetermined value in the half-tone portion, there can be obtained not only a superior color balance and an improved color reproducibility.

Accordingly, the features of the first preferred embodiment according to the present invention are as follows. When the developing bias voltage $V_B$ and the grid voltage $V_G$ required for obtaining a desirable adhering toner amount are not fallen in the adjustable ranges thereof, respectively, the developing bias voltage $V_B$ and the grid voltage $V_G$ are respectively set to the predetermined maximum or minimum values, and the γ correction table is altered depending on the developing efficiency so as to obtain a desirable gradation characteristic.

Specifically speaking, in the present preferred embodiment, set values of the developing bias voltage $V_B$ and the grid voltage $V_G$ are changed depending on a density detection level LBA corresponding to the detection value detected by the AIDC sensor 210 so that each developing bias voltage $V_G$ corresponds to each grid voltage $V_G$. Further, when the grid voltage $V_G$ is set to the maximum value of the adjustable range thereof (1000 V in the present preferred embodiment) and the developing bias voltage $V_B$ is set to the maximum value of the adjustable range thereof (710 V in the present preferred embodiment), or when the grid voltage $V_G$ is set to the minimum value of the adjustable range thereof (500 V in the present preferred embodiment) and the developing bias voltage $V_B$ is set to the minimum value of the adjustable range thereof (280 V in the present preferred embodiment), data of the γ correction table are altered so as to obtain a desirable gradation characteristic depending on the density detection level LBA.

By the way, generally speaking, since the gradient of the image reproduction density to adhering toner amount characteristic becomes relatively small at a relatively large adhering toner amount, change in the maximum image reproduction density becomes smaller than change in the adhering toner amount. Therefore, it is considered that there is little influence to the maximum image reproduction density even when the adhering toner amount reaches a desirable value. However, the image reproduction density to light amount characteristic rather changes due to a non-linearlity of the image reproduction density to adhering toner amount characteristic, particularly, the above characteristic changes in a range from a half-tone portion to a relatively high density portion. Therefore, when data of the γ correction table are altered in a manner of the present preferred embodiment, it is necessary to keep the gradation characteristic of the image to be reproduced.

FIG. 11 is a graph of a sensitometry showing an image reproduction density to light amount characteristic, an image reproduction characteristic, a γ correction characteristic and an image read characteristic of the digital full color copying apparatus of the first preferred embodiment in the case of the combination of the minimum grid voltage $V_G$ and the minimum developing bias voltage $V_B$, and FIG. 12 is a graph of a sensitometry showing an image reproduction density to light amount characteristic, an image reproduction characteristic, a γ correction characteristic and an image read characteristic of the digital full color copying apparatus of the first preferred embodiment in the case of the combination of the maximum grid voltage $V_G$ and the maximum developing bias voltage $V_B$.

In FIGS. 11 and 12, γ correction characteristic curves T0, T0a, T0b, T11, T11a and T11b shown in FIGS. 11 and 12 respectively correspond to respective γ correction tables shown in Table 3 as described later. Moreover, in FIG. 11, characteristic curves DC0, DC0a and DC0b shown in the image reproduction density to light amount characteristic correspond to γ correction characteristic curves T0, T0a and T0b, respectively. Further, in FIG. 12, characteristic curves DC11, DC12 and DC13 shown in the image reproduction density to light amount characteristic correspond to not only γ correction characteristics T11, T11a and T11b but also image reproduction characteristics IRC11, IRC12 and IRC13, respectively.

As is apparent from FIG. 11, when the minimum grid voltage $V_G$ is used in combination with the minimum developing bias voltage $V_B$, that is, when the developing efficiency is relatively high, the adhering toner amount can be reduced by decreasing the maximum light amount or the maximum exposure level. Accordingly, a stable color reproduction characteristic can be obtained without influencing the image reproduction density characteristic. In other words, the first problem described above can be solved.

Moreover, as shown in FIG. 12, when the maximum grid voltage $V_G$ and maximum developing bias voltage $V_B$ are used, namely, the developing efficiency is relatively low, the maximum image reproduction density is lowered, however, the image of the half-tone portion is reproduced with the same density. Therefore, a stable color reproducibility can be obtained without substantially influencing the color balance. Namely, the second problem described above can be solved.

According to the present preferred embodiment, even when the developing efficiency changes due to change in the circumstances of the developer and the grid voltage $V_G$ and the developing bias voltage $V_B$ are set to the maximum or minimum values thereof resulting in difficulty to obtain a desired gradation characteristic, a stable color reproducibility can be obtained by changing data of the γ correction table, particularly, it becomes possible to obtain a favorable gradation in the half-tone portion of the reproduced image.

As compared with such a case that the output transformers of the $V_G$ and $V_B$ generators 243 and 244 are exchanged with the other ones having wider adjustable ranges of the output voltages in order to achieve the above-mentioned effects, the costs of the output transformers thereof can be reduced. For example, if numbers of switching steps for switching the grid voltage $V_G$ and the developing bias voltage $V_B$ of the output transformers of the respective $V_G$ and $V_B$ generators 243 and 244 are the same as each other, changes in the output voltages by each step can be set relatively small values in the present preferred embodiment. Therefore, there is such an advantage that the image density control process can be performed with a higher accuracy by changing the grid voltage $V_G$ and the developing bias voltage $V_B$, more finely.

Further, the grid voltage $V_G$ is originally regulated by the voltage-proof property of the photoconductive drum 41 and the performance of the corona charger 44. The grid voltage $V_G$ is generally set to a voltage value lower than 1000 V. Therefore, the lower limit of the developing efficiency upon controlling the adhering toner amount is determined based on the maximum value of the grid voltage $V_G$. However, in the present preferred embodiment, the color reproducibility of the reproduced image can be maintained stable in a predetermined range where there is caused no problem even when the developing efficiency is lower than the above lower limit thereof.

Tables 1 to 3 show an example of data of combinations of ($V_B$, $V_G$) set in the present preferred embodiment. In the present preferred embodiment, the developing bias voltage $V_B$ and the grid voltage $V_G$ are respectively set to negative values, however, they are expressed in a form of absolute values in Table 2.

In Tables 1 to 3, the detected adhering toner amount is an adhering toner amount which is measured by the AIDC sensor 210 with respect to the reference toner image formed under a reference toner image forming condition which is described later, and the developing efficiency is determined for the detected adhering toner amount. In this case, a developing voltage ΔVd (referred to as a setting developing voltage hereinafter) required for obtaining a desirable adhering toner amount is defined by the following equation:

$$\text{Setting developing voltage } \Delta Vd = \frac{\text{(Desireable adhering toner amount)}}{\text{(Developing efficiency)}}. \quad (3)$$

In the present preferred embodiment, the desirable adhering toner amount is 1 mg/cm$^2$, and there is shown in Table 1 the setting developing voltage ΔVd at that time.

The detection values of the AIDC sensor 210 correspond to the density detection levels LBA in a range from zero to 15 as shown in Tables 1 to 3. Depending on the respective density detection levels LBA, the developing bias voltage $V_B$ is changed from 280 V to 710 V, and also the grid voltage $V_G$ is changed from 500 V to 1000 V. Further, in a range of the density detection level LBA from two to 13, either one of γ correction tables T0 to T11 is selected depending on the combination of the grid voltage $V_G$ and the developing bias voltage $V_B$ based on the desirable image reproduction characteristic in a manner similar to that of conventional apparatus. In the combination of the minimum grid voltage $V_G$ and the minimum developing bias voltage $V_B$, when the density detection level LBA is smaller than two, either one of γ correction tables T0a and T0b is selected depending on the density detection level LBA. Moreover, in the combination of the maximum grid voltage $V_G$ and the maximum developing bias voltage $V_B$, when the density detection level LBA is larger than 13, either one of γ correction tables T11a and T11b is selected depending on the density detection level LBA.

Namely, in the present preferred embodiment, data of the three γ correction tables T0, T0a and T0b different from each other corresponding to the combination of the minimum grid voltage $V_G$ and the minimum developing bias voltage $V_B$ are previously stored in the data ROM 203, and data of the three γ correction tables T11, T11a and T11b different from each other corresponding to the combination of the maximum grid voltage $V_G$ and the maximum developing bias voltage $V_B$ are previously stored in the data ROM 203.

As shown in Tables 1 to 3, there are provided the density detection levels LBA from two to 13 in a density range which can be covered by the image density control process for adjusting the image reproduction density by changing the combination of the grid voltage $V_G$ and the developing bias voltage $V_B$. Outside of the covered density range is arranged a density range for obtaining a predetermined gradation characteristic by changing data of the γ correction table according to the first preferred embodiment of the present invention.

For example, as shown in the second quadrant of FIG. 11, in the case of an image reproduction characteristic to light amount characteristic DC0b, an image reproduction characteristic shown in the first quadrant of FIG. 11 is obtained by performing the γ correction process using the γ correction table T0b. Further, for example, as shown in the second quadrant of FIG. 12, in the case of an image reproduction characteristic to light amount characteristic DC13, an image reproduction characteristic IRC13 shown in the first quadrant of FIG. 12 is obtained by performing the γ correction process using the γ correction table T11b.

The image density control process of the first preferred embodiment according to the present invention in the digital full color copying apparatus will be described below.

In the electrophotographic process of reversal development type of the present preferred embodiment, the image reproduction density is automatically controlled in accordance with the grid voltage $V_G$ and the developing bias voltage $V_B$, in a manner similar to that of the conventional apparatus.

On the other hand, the adhering toner amount onto the photoconductive drum 41 upon a predetermined exposure level EXL is detected by the AIDC sensor 210. In the present preferred embodiment, a condition of a grid voltage $V_G$ of 600 V, a developing bias voltage $V_B$ of 400 V and an exposure level EXL of 120 is referred to as a reference toner image forming condition hereinafter. In this case, the surface electric potential $V_I$ after the exposure of a beam of laser light is set to 300 V, and then, the developing voltage $\Delta V=|V_B-V_I|$ becomes 100 V. Under the above-mentioned reference toner image forming condition, a reference toner image which become a reference for the image density control process is formed on the photoconductive drum 41, and then, a regular reflected light and a scattering reflected light from the reference toner image are detected by the AIDC sensor 210 provided in the vicinity of the photoconductive drum 41. Respective detection signals of the regular reflected light and the scattering reflected light are inputted from the AIDC sensor 210 to the printer controller 201, and then, the printer controller 201 calculates an adhering toner amount based on a difference between the inputted respective detection signals.

The automatic image density control process for making the adhering toner amount at the maximum image reproduction density level constant is performed by changing a combination of the surface electric potential Vo on the photoconductive drum 41 or the grid voltage $V_G$ and the developing bias voltage $V_B$ based on the calculated adhering toner amount. If the grid voltage $V_G$ and the developing bias voltage $V_B$ are not fallen in the adjustable ranges thereof, the automatic image density control process is performed so as to obtain a desirable gradation characteristic by changing data of the γ correction table.

For example, when the electric charge amount of toner changes due to change in circumstances such as the relative humidity and then the developing efficiency changes, the maximum image reproduction density can be automatically kept constant by changing the grid voltage $V_G$ and the developing bias voltage $V_B$. Further, if the grid voltage $V_G$ and the developing bias voltage $V_B$ are not fallen in the adjustable ranges thereof, the automatic image density control process is performed so as to obtain a desirable gradation characteristic by changing data of the γ correction table.

(d) Control flow of printing process

Figure 6:
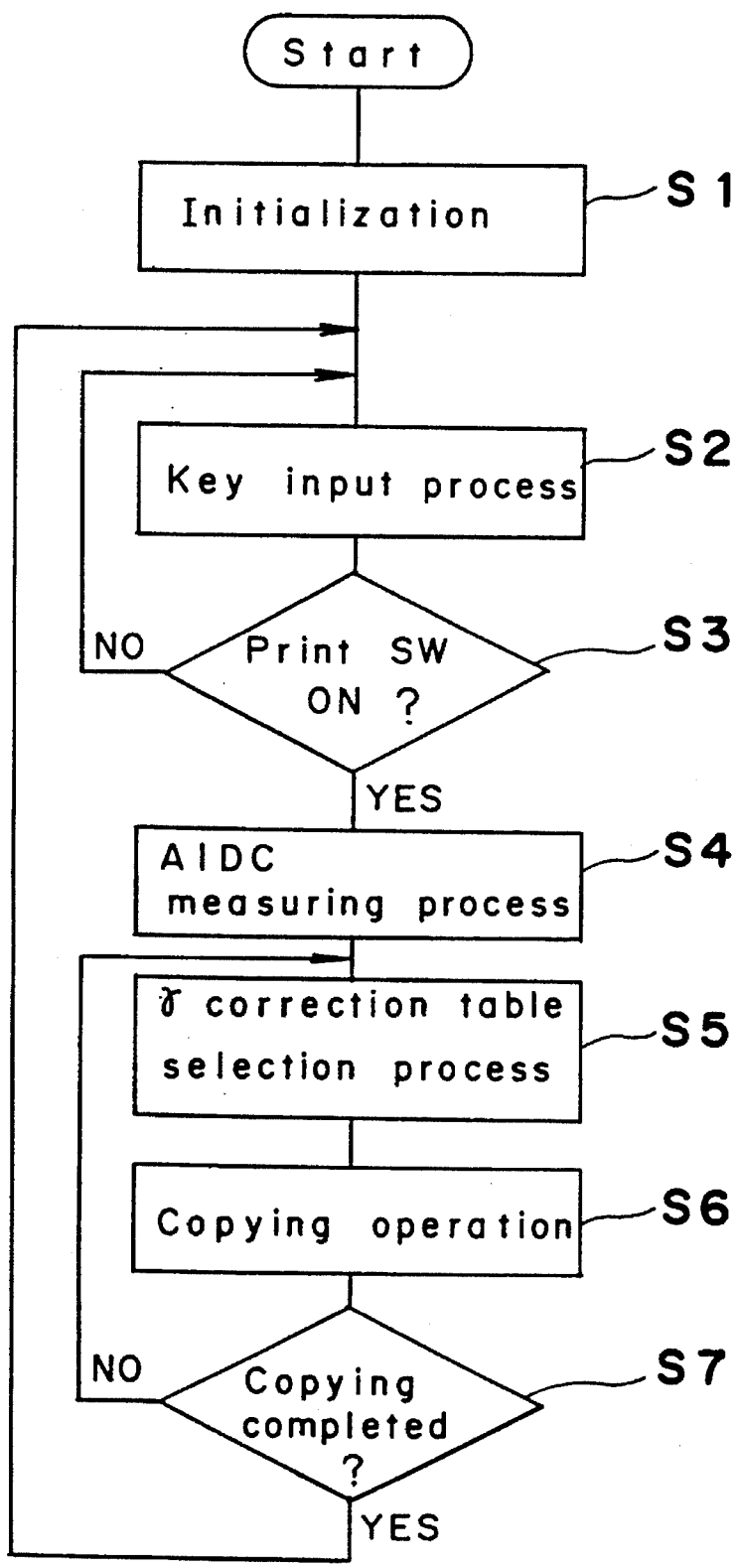
FIG. 6 is a flow chart of a control flow executed by the printer controller shown in FIG. 2b.

The control flow of printing process in the printer controller 201 will be described with reference to a flow chart shown in FIG. 6.

In the first place, after the printer controller 201 is initialized thereinside in step S1, there is performed an input process of the operation panel 221 in step S2. Thereafter, it is detected in step S3 whether or not a print switch (not shown) of the operation panel 221 is turned on. When the print switch is not turned on (NO in step S3), the program flow goes back to step S2, and then, the printer controller 201 becomes a stand-by state until the print switch is turned on.

On the other hand, when the print switch is turned on (YES in step S3), an AIDC process is carried out in step S4. In the AIDC process, the grid voltage $V_G$ and the developing bias voltage $V_B$ are set to respective predetermined standard values, and then, a predetermined detection image pattern is formed on the photoconductive drum 41. Thereafter, the predetermined detection image pattern is developed using toner so as to form the reference toner image thereon. An image reproduction density corresponding to an adhering toner amount of the reference toner image is measured by the AIDC sensor 211, and then, data thereof are stored in a RAM provided in the printer controller 201.

In step S5, there is performed a γ correction table selection process for selecting a γ correction table among the plural γ correction tables, namely, a grid voltage $V_G$, a developing bias voltage $V_B$, and a γ correction table (one of the 16 γ correction tables T0b, T0a, T0 to T11, T11a and T11b) are selected from Tables 1 to 3 on the basis of the density detection level LBA corresponding to the adhering toner amount detected in the AIDC process. Thereafter, the copying process known to those skilled in the art is performed in step S6 based on the selected grid voltage $V_G$, the selected developing bias voltage $V_B$, and the selected γ correction table.

Thereafter, it is checked in step S7 whether or not the copying process is completed. If the copying process is completed (YES in step S7), the program flow returns to step S2. On the other hand, if the copying process is not completed (NO in step S7), the program flow returns to step S5.

As described above, according to the present preferred embodiment, upon performing the image density control process, even though the density detected by the AIDC sensor 210 is not fallen in the adjustable range thereof, there can be obtained a predetermined gradation characteristic, thereby always printing an image having a predetermined gradation reproducibility for an original.

In the present preferred embodiment, there are used the above-mentioned gradation correction method, the above-mentioned density adjusting method and the above-mentioned γ correction tables, however, the present invention is not limited to this. There may be used the other gradation correction method, the other density adjusting method and the other γ correction table.

SECOND PREFERRED EMBODIMENT

A digital full color copying apparatus of a second preferred embodiment according to the present invention will be described below. It is to be noted that the digital full color copying apparatus of the second preferred embodiment has the same composition of that of the first preferred embodiment shown in FIGS. 1 to 4.

The features of the digital full color copying apparatus of the second preferred embodiment according to the present invention using an electrophotographic process of reversal development type for printing an image using an intensity modulation method are as follows. Upon adjusting an image reproduction density so as to make the maximum image reproduction density constant, the digital full color copying apparatus comprises the fog input switches 204 of two bits of respective colors each provided for selectively setting one of the fog removal levels LBK from zero to three in four steps for a grid voltage $V_G$ when the operator of the user judges that a proper image is reproduced. Further, upon changing a combination of the grid voltage $V_G$ and the developing bias voltage $V_B$ based on the detection value of the AIDC sensor 210, when the grid voltage $V_G$ does not reach the maximum value of the adjustable range thereof, the image density control process is performed by setting the grid voltage $V_G$ to a higher value without changing the γ correction table so as to obtain a desirable gradation characteristic. On the other hand, when the grid voltage $V_G$ reaches the maximum value of the adjustable range thereof, the image density control process is performed by changing the $\gamma$ correction table so as to obtain a desirable gradation characteristic based on the set fog removal level LBK.

An automatic density control and a gradation correction in the electrophotographic process of reversal development type of the present preferred embodiment will be described below.

Figure 15:
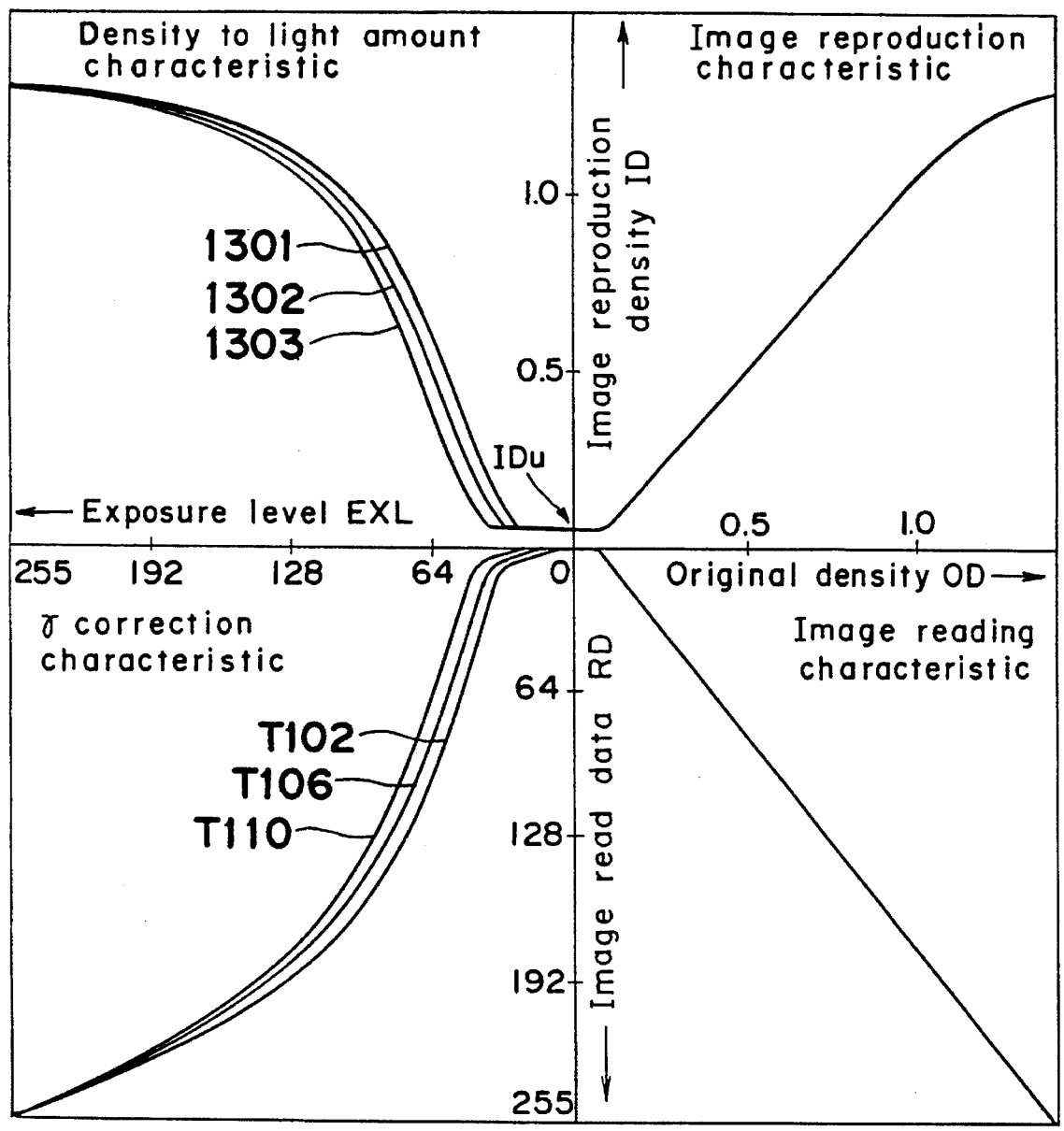
FIG. 15 is a graph of a sensitometry showing an image reproduction density to light amount characteristic, an image reproduction characteristic, a γ correction characteristic and an image read characteristic of the conventional digital full color copying apparatus.

FIG. 15 is a graph of a sensitometry showing an image reproduction density to light amount characteristic, an image reproduction characteristic, a $\gamma$ correction characteristic and an image read characteristic, of the conventional digital full color copying apparatus described in the above description of the related art, which controls the image reproduction density so that the difference between the surface potential Vo on the photoconductive drum 41 and the developing bias voltage $V_B$ is made constant.

In FIGS. 15 to 17 and 20, the image reproduction density ID is represented as an absolute density which is the sum of an image density of a printed image and a density of a background of a copying paper on which the image is to be printed. Therefore, even though an original density is zero, there can be measured an image density IDu of the background of the copying paper.

Further, in the image reproduction density to light amount characteristic of FIG. 15, a characteristic curve 1301 is that in applications of a grid voltage $V_G$ of 570 V and a developing bias voltage $V_B$ of 345 V, a characteristic curve 1302 is that in applications of a grid voltage $V_G$ of 700 V and a developing bias voltage $V_B$ of 450 V, and a characteristic curve 1303 is that in applications of a grid voltage $V_G$ of 900 V and a developing bias voltage $V_B$ of 620 V. In this case, $\gamma$ correction characteristics T102, T106 and T110 can be previously made in a manner similar to those skilled in the art so as to obtain a desirable image reproduction characteristic shown in the first quadrant of the sensitometry shown in FIG. 15, based on the above image reproduction density to light amount characteristics 1301, 1302 and 1303, respectively.

It is to be noted that respective characteristic curves shown in FIG. 15 correspond to the $\gamma$ correction tables T102, T106 and T110 shown in Table 7 provided in the present preferred embodiment.

By the way, in the digital image forming apparatus, particularly, in the full color image forming apparatus, it is an important problem to be solved to remove a fog. It is generally considered that a fog may be formed by not only lowering of the surface electric potential Vo prior to an exposure of a beam of laser light which is caused due to deterioration of the photoconductor characteristic of the photoconductive drum 41 but also deterioration of the developer. In order to prevent any fog which may be caused due to the deterioration of the photoconductor characteristic of the photoconductive drum 41, conventionally, there is used a method of heightening the grid voltage $V_G$ so as to set the surface electric potential Vo to that in the initial state. However, in order to prevent any fog which may be caused due to the deterioration of the developer, even if the grid voltage $V_G$ is heightened, it is known to those skilled in the art that the effects of removing the fog are relatively small. In order to completely prevent the fog, it is necessary to exchange the developer with new one.

Therefore, an essential object of the present preferred embodiment according to the present invention is to provide the digital full color copying apparatus capable of removing any fog which may be caused due to the former.

First of all, an influence to a reproduced image by lowering of the surface electric potential Vo on the photoconductive drum 41 prior to the exposure of a beam of laser light will be described below.

According to experiments performed by the present inventors, in the conventional digital full color copying apparatus, when the surface electric potential Vo is lowered due to deterioration of the photoconductor characteristic of the photoconductive drum 41 so that $|Vo -V_B|$ becomes equal to or smaller than 150 V, there is caused a fog on a background of a sheet of copying paper.

Figure 16:
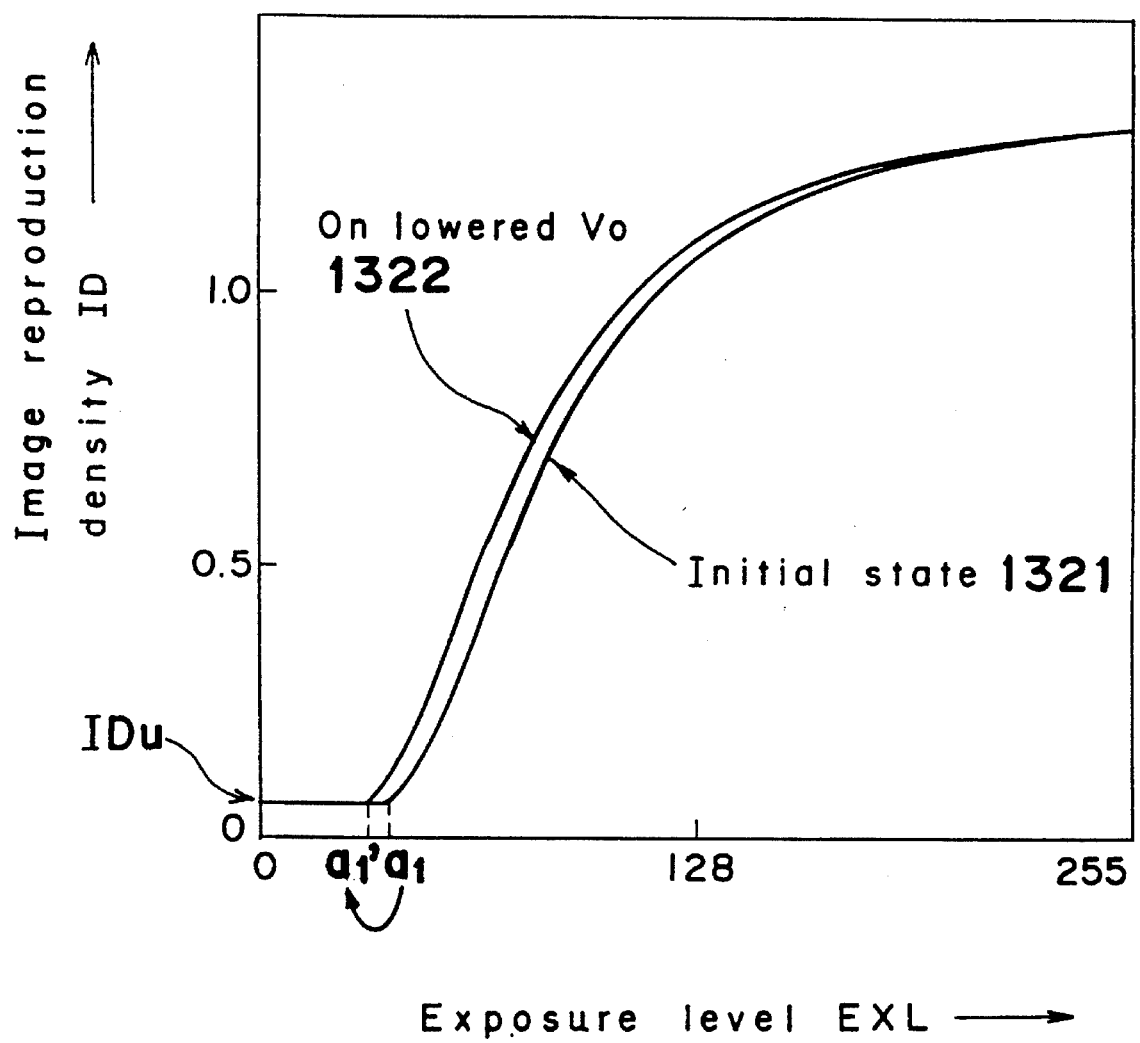
FIG. 16 is a graph showing an image reproduction density to light amount characteristic when there is lowered a surface electric potential Vo on the photoconductive drum prior to an exposure of a beam of laser light from that in an initial state in the conventional digital full color copying apparatus.

Further, when there is selected a combination of the grid voltage $V_G$ and the developing bias voltage $V_B$, the $\gamma$ correction table corresponding to the selected combination thereof is made based on the surface electric potential Vo prior to the exposure of a beam of laser light to grid voltage $V_G$ which is obtained as an initial characteristic of the photoconductor of the photoconductor drum 41. Therefore, when the surface electric potential Vo is lowered from that in the initial state at the same grid voltage $V_G$, a reproduction start light amount defined as a light amount of a beam of laser or the exposure level EXL when an image is first reproduced as the exposure level is changed from zero to a larger value is lowered from $a_1$ to $a_1'$, as is apparent from a comparison between a characteristic curve 1321 in the initial state and a characteristic curve 1322 when the surface electric potential Vo is lowered which are shown in FIG. 16. Then, a fog is caused and also the image reproduction characteristic changes.

Figure 17:
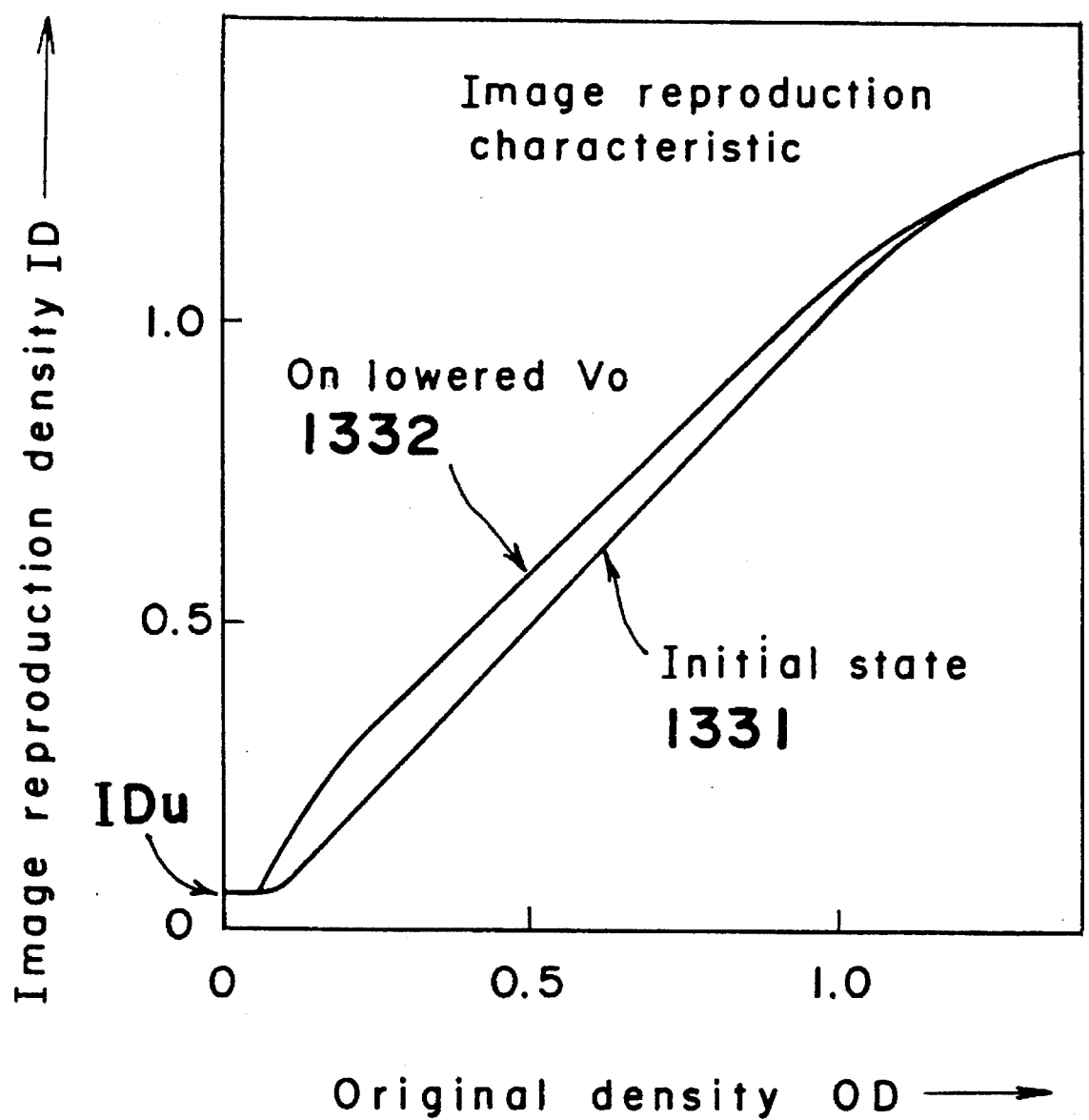
FIG. 17 is a graph showing an image reproduction characteristic when there is lowered the surface electric potential Vo on the photoconductive drum prior to the exposure of a beam of laser light from that in the initial state in the conventional digital full color copying apparatus.

FIG. 17 shows an image reproduction characteristic when the $\gamma$ correction process is performed using a $\gamma$ correction characteristic for the image reproduction density to light amount characteristic shown in FIG. 16.

As is apparent from FIG. 17, when the surface electric potential Vo on the photoconductive drum 41 is lowered from that in the initial state, an image reproduction density of a high light portion increases, and then, this is reproduced as a turbidity of color in a reproduced full color image. Further, a difference between the adjacent image reproduction densities every one gradation of the image data is increased in a high light portion thereof, resulting in a pseudo contour around the reproduced image.

In order to solve the above-mentioned problem, there are provided the fog input switches 204 of two bits of respective colors each provided for selectively setting one of the fog removal levels LBK from zero to three in four steps for a grid voltage $V_G$ when the operator of the user judges that a proper image is reproduced. Further, upon changing a combination of the grid voltage $V_G$ and the developing bias voltage $V_B$ based on the detection value of the AIDC sensor 210, when the grid voltage $V_G$ does not reach the maximum value of the adjustable range thereof (1000 V in the present preferred embodiment, and it means the maximum output voltage of the output transformer of the $V_G$ generator 243), the image density control process is performed by setting the grid voltage $V_G$ to a higher value without changing the $\gamma$ correction table so as to obtain a desirable gradation characteristic. On the other hand, when the grid voltage $V_G$ reaches the maximum value of the adjustable range thereof, the image density control process is performed by changing the $\gamma$ correction table so as to obtain a desirable gradation characteristic based on the set fog removal level LBK.

Figure 18:
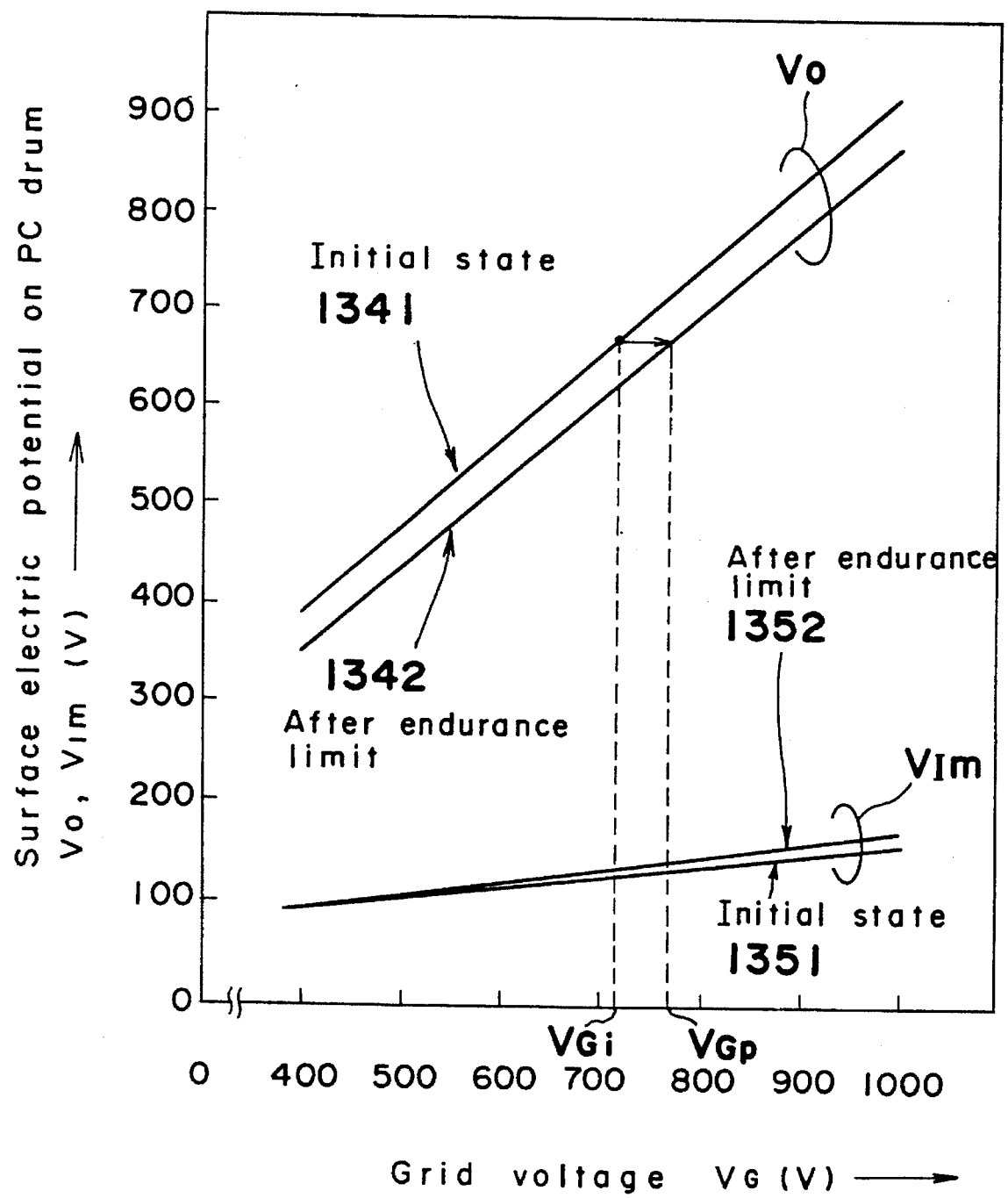
FIG. 18 is a graph showing a surface electric potential Vo to grid voltage $V_G$ characteristic when there is lowered the surface electric potential Vo on the photoconductive drum prior to the exposure of a beam of laser light from that in the initial state in the conventional digital full color copying apparatus.

Upon changing a combination of the grid voltage $V_G$ and the developing bias voltage $V_B$ based on the detection value of the AIDC sensor 210, when the grid voltage $V_G$ does not reach the maximum value of the adjustable range thereof, the grid voltage $V_G$ is heightened as shown in FIG. 18 from a grid voltage $V_{Gi}$ (when the surface electric potential Vo is obtained by the photoconductor characteristic of the photoconductive drum 41 in the initial state) to a grid voltage $V_{Gp}$ (required for inducing the same surface electric potential Vo as that in the initial state when the surface electric potential Vo is lowered due to deterioration of the photoconductor characteristic of the photoconductive drum 41 or after an endurance limit of the printing process using the photoconductive drum 41 (referred to as an endurance limit hereinafter)), and then, there can be obtained the same surface electric potential Vo as that in the initial state. At that time, since the absolute value $|Vo-V_B|$ becomes the same as that in the initial state, the fog can be removed. Further, since the reproduction start light amount in the image reproduction density to light amount characteristic becomes approximately the same as that in the initial state, there is no change in the gradation characteristic even using the same γ correction table.

Figure 19:
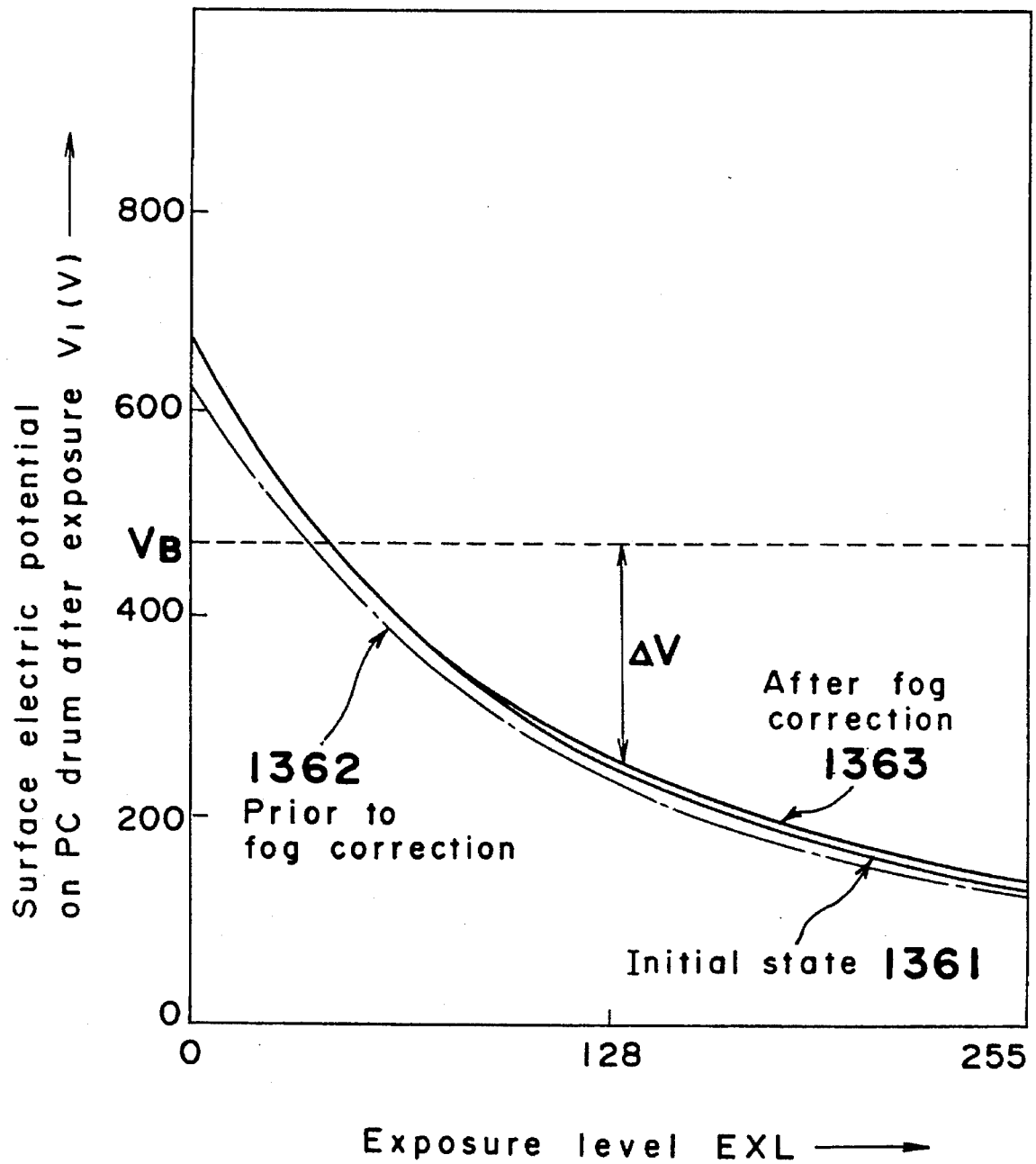
FIG. 19 is a graph showing a surface electric potential Vo to light exposure level characteristic in the cases when there is lowered the surface electric potential Vo on the photoconductive drum prior to the exposure of a beam of laser light from that in the initial state and when a fog correction process is performed in the conventional digital full color copying apparatus and the digital full color digital copying apparatus of the second preferred embodiment.

FIG. 19 shows characteristic curves of the surface electric potential $V_I$ on the photoconductive drum 41 to the light amount at the initial state, at a timing prior to a fog correction process after the endurance limit and at a timing after the fog correction process performed after the endurance limit. In FIG. 19, a characteristic curve 1361 is that in the initial state, a characteristic curve 1362 is that prior to the fog correction process after the endurance limit, and a characteristic curve 1363 is that after the fog correction process performed after the endurance limit.

As is apparent from FIG. 19, the fog correction process is performed by heightening the grid voltage $V_G$ after the endurance limit so that the surface electric potential Vo is set to approximately the same value as that in the initial state, and then, there can be obtained approximately the same surface electric potential $V_I$ to light amount characteristic as that in the initial state.

As described above, when the grid voltage $V_G$ is heightened, any fog can be completely removed. However, when the grid voltage $V_G$ reaches the maximum value of the adjustable range thereof, the fog can not be removed. On the other hand, in the case where the gradation reproducibility characteristic changes after the endurance limit, the original image can be reproduced by changing the γ correction table so as to keep a desirable gradation. characteristic using the digital full color copying apparatus of the present preferred embodiment. Further, a fog can be slightly removed by making a γ correction table using a method described below.

The method for making a γ correction table for removing the fog will be described below, concretely.

For example, it is assumed that the adjustable range of the grid voltage $V_G$ which is the output voltage of the $V_G$ generator 243 is from 500 V to 1000 V, and the grid voltage $V_G$ can be set in a step of 10 V by switching a tap of the output transformer of the $V_G$ generator 243. Generally, the surface electric potential Vo to grid voltage $V_G$ characteristic has a gradient of about one, namely, is substantially linear. Therefore, even though the surface electric potential Vo is lowered after the endurance limit, this characteristic does not change. In this case, for example, there is set the fog removal level of one step for lowering of the surface electric potential Vo by 30 V.

According to experiments performed by the present inventors, in the digital full color copying apparatus of the present preferred embodiment, when the maximum value of the grid voltage $V_G$ in the initial state was 1000 V, there was induced a surface electric potential Vo of 910 V on the photoconductive drum 41.

Thereafter, there is obtained a sensitivity characteristic of the photoconductor of the photoconductive drum 41 when the surface electric potential Vo is lowered by a voltage of 30 V corresponding to a voltage of one step of the fog removal level, by an actual measurement or using an approximate equation. Then, there is obtained a developing voltage $\Delta V$ to light amount characteristic from the obtained sensitivity characteristic of the photoconductor, and further, an adhering toner amount to light amount characteristic is obtained by multiplying the obtained developing voltage $\Delta V$ to light amount characteristic by developing efficiencies. On the other hand, an image reproduction density to light amount characteristic is obtained based on the image reproduction density to adhering toner amount characteristic. It is to be noted that the reproduction start light amount in this case is smaller than that in the initial state. Thereafter, a desirable γ correction characteristic or a desirable gradation characteristic is obtained in a manner similar to that known to those skilled in the art based on the above-obtained image reproduction density to light amount characteristic.

Figure 20:
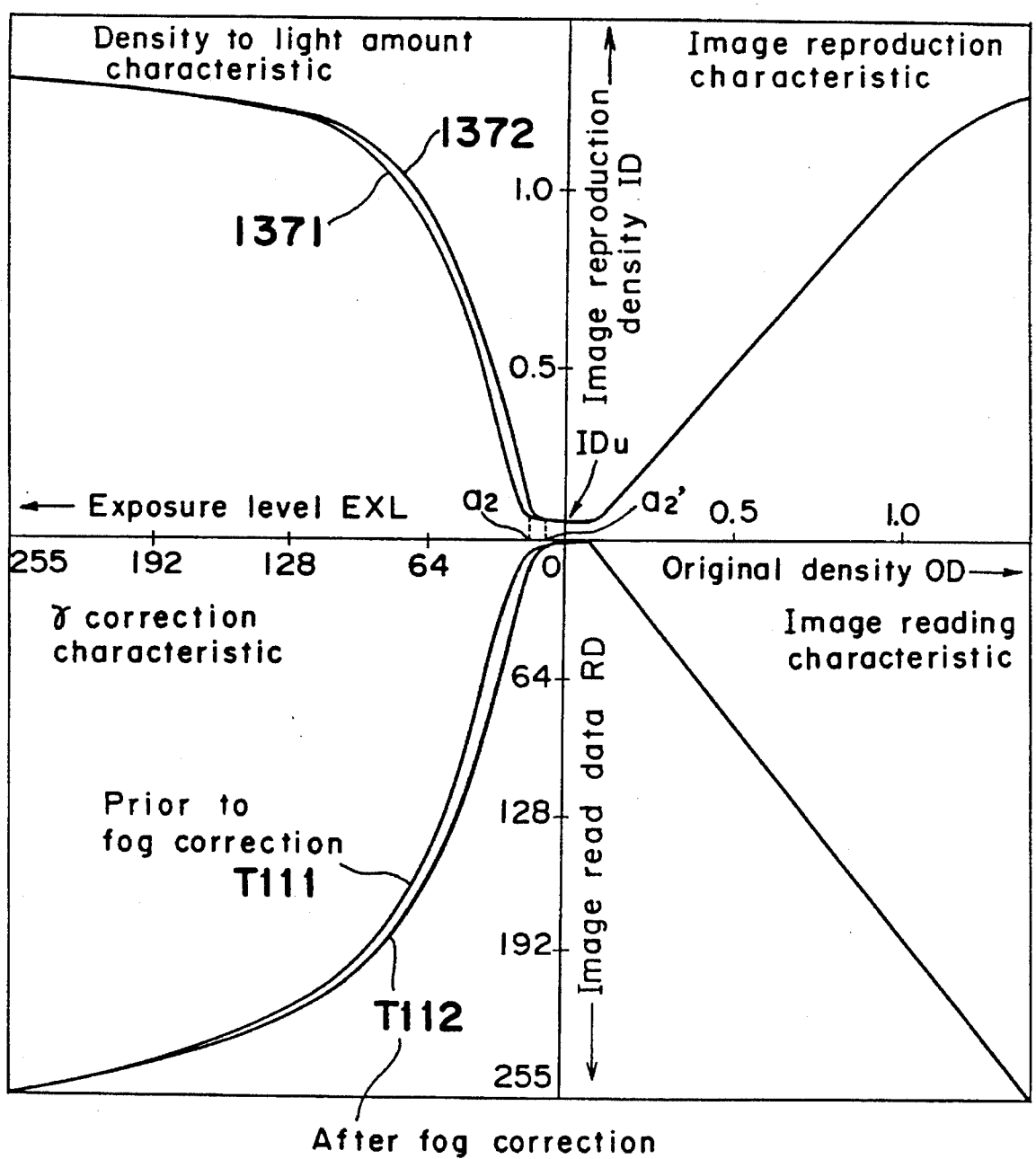
FIG. 20 is a graph of a sensitometry showing an image reproduction density to light amount characteristic, an image reproduction characteristic, a γ correction characteristic and an image read characteristic when the fog correction process is performed in the digital full color copying apparatus of the second preferred embodiment.

FIG. 20 shows sensitometry including the γ correction characteristic of the present preferred embodiment which is obtained as described above. In the image reproduction density to light amount characteristic shown in the second quadrant of FIG. 20, a characteristic curve 1371 is that in the case of a fog removal level LBK of zero which is set using the fog input switch 214 when the adhering toner amount of the reference toner image is 0.18 mg/cm$^2$ which is detected by developing an electrostatic latent image of a reference pattern image with toner so as to form the reference toner image in the AIDC process. Further, a characteristic curve 1372 is that in the case of a fog removal level LBK of one which is set using the fog input switch 214 when the adhering toner amount is 0.18 mg/cm$^2$ which is detected in a similar manner.

As is apparent from FIG. 20, even when the surface electric potential Vo on the photoconductive drum 41 is lowered due to change in the photoconductor characteristic of the photoconductor thereof, the reproduction start light amount is lowered from $a_2$ to $a_2'$. At that time, however, the fog removal level LBK is changed from zero to one using the fog input switch 214 so that the γ correction table is changed from T111 to T112, and then, the fog can be removed. Further, there can be obtained a predetermined image reproduction characteristic shown in the first quadrant of FIG. 20.

Figure 21:
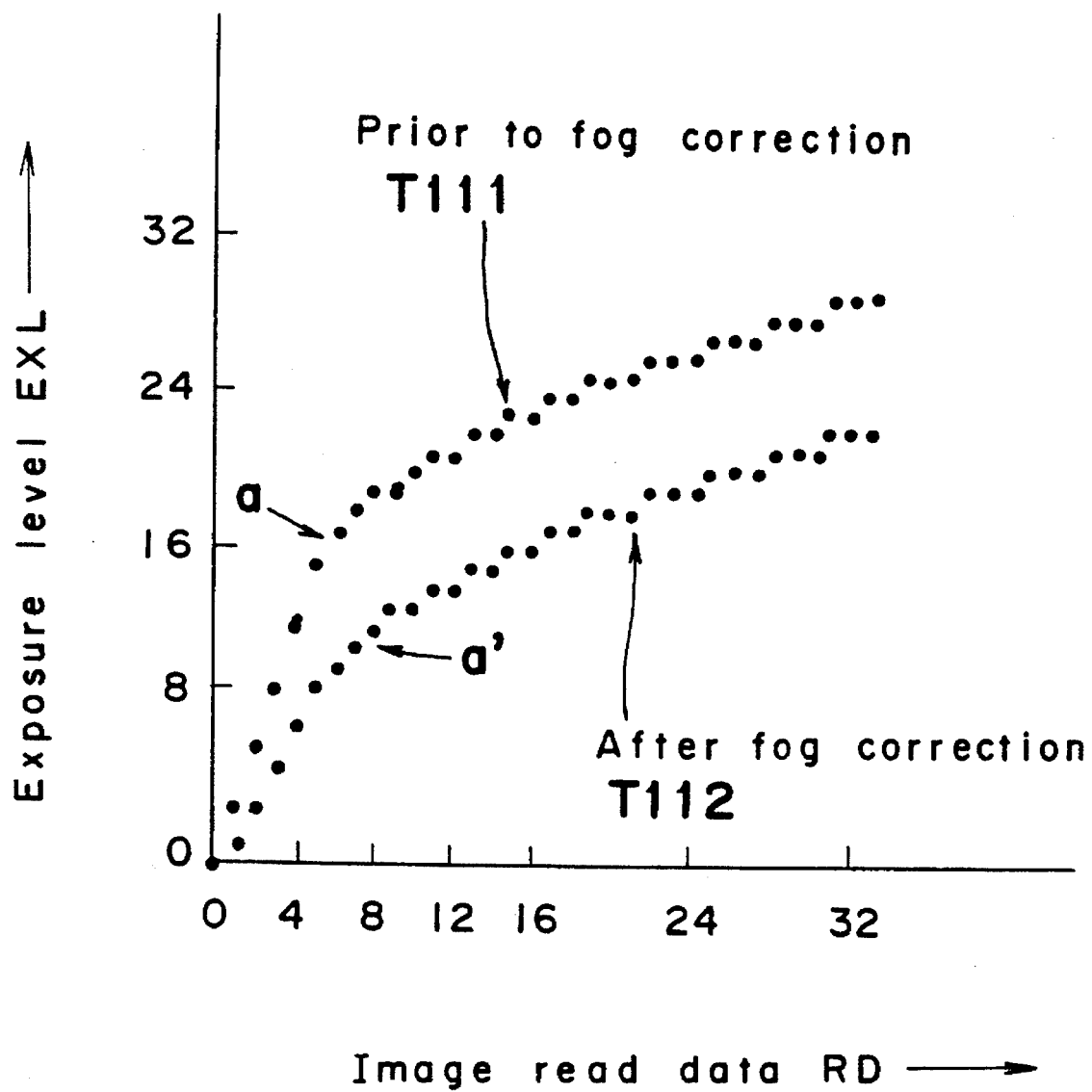
FIG. 21 is an enlarged graph of a low density portion of the γ correction characteristic shown in FIG. 20.

FIG. 21 is an enlarged graph of a low density portion of the γ correction characteristic shown in the third quadrant of FIG. 20.

In FIG. 21, a range of an image read data RD from zero to four corresponds to a density of a background of an original. In order to remove any dirty or spot on the original, it is desirable not to reproduce the image of the original in this range of the image read data RD. However, when the exposure level EXL is set to zero in this range thereof, differences between the adjacent data of the exposure levels become relatively large when the reproduction start light amount changes due to small change in the surface electric potential Vo on the photoconductive drum 41. Therefore, noises such as the above-mentioned pseudo contour are caused on the reproduced image, while a fog is caused when a too large exposure level EXL is set for a range of the image read data RD (density level) an image of which is not formed.

Figure 22:
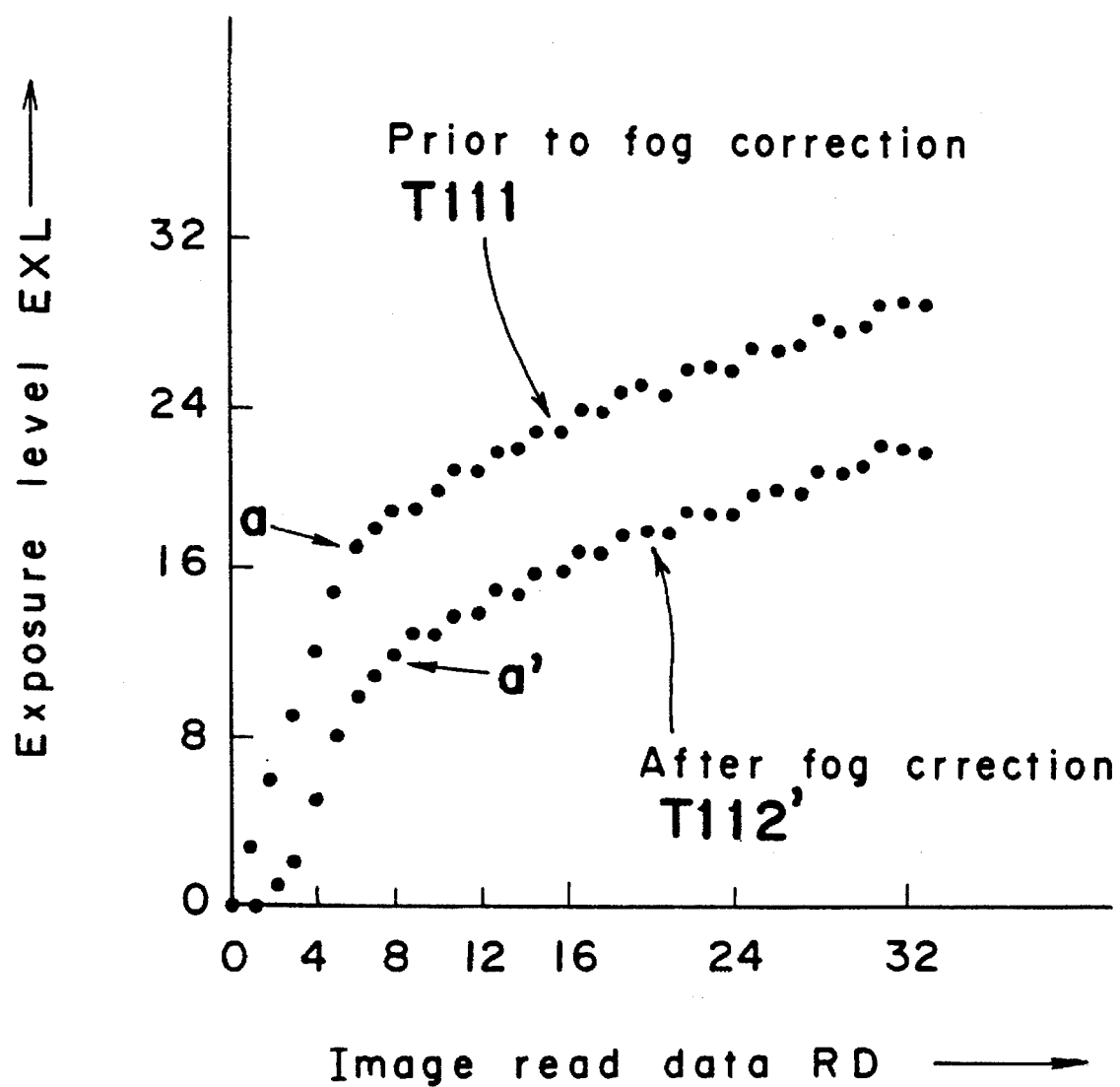
FIG. 22 is an enlarged graph of a low density portion of an improved γ correction characteristic according to the second preferred embodiment.

In order to prevent such a pseudo contour and fog, there is preferably used an improved γ correction characteristic T112' shown in FIG. 22. As shown in FIG. 21, when the γ correction characteristic is changed from T11 to T112, the reproduction start light amount is lowered as described above. Therefore, the γ correction characteristic T112' is set as follows: a gradient thereof in a range of the exposure level EXL smaller than the reproduction start light amount a' is set to be increased so as to become substantially the same as the gradient of the γ correction characteristic T111, and also the γ correction characteristic T112' is set so as to become parallel to the γ correction characteristic T111. In this case, the fog can be substantially completely removed, and also the pseudo contour can be prevented.

FIGS. 13a to 13c are schematic diagrams showing changes in the grid voltage $V_G$, the surface electric potential Vo prior to the exposure of a beam of laser light, the developing bias voltage $V_B$, and the surface electric potential $V_{Im}$ when projecting a beam of laser light having the maximum light amount onto the photoconductive drum 41, in the case of respective density levels of the reference toner image formed on the photoconductive drum 41, or in the cases of the respective density detection levels LBA detected by the AIDC sensor 201. In FIGS. 13a to 13c, the density detection level LBA detected by the AIDC sensor 201 is added as a subscript to the last portion of the subscript of $V_G$, Vo, $V_B$ and $V_{Im}$. FIGS. 13a to 13c schematically show changes in the voltages and the electric potentials when a beam of laser light of one dot image having the maximum light amount is projected onto the photoconductive drum 41.

FIGS. 14a to 14d are schematic diagrams showing change in the electric potential Vo on the photoconductive drum 41 in the case of the same developing bias voltage $V_B$ and an original density OD of five. As shown in FIGS. 14a to 14d, a developing bias voltage $V_{B5}$ is determined depending on the density detection level LBA detected by the AIDC sensor 210, and also the grid voltage $V_G$ is changed in four steps of $V_{G50}$ to $V_{G53}$ corresponding to the fog removal levels LBK from zero to three which are set by the operator of the user.

Tables 4 to 7 show an example of data of combinations of ($V_B$, $V_G$) set in the present preferred embodiment. In the present preferred embodiment, the developing bias voltage $V_B$ and the grid voltage $V_G$ are respectively set to negative values, however, they are expressed in a form of absolute values in Tables 5 to 7.

In Tables 4 to 7, the detected adhering toner amount is an adhering toner amount which is measured by the AIDC sensor 210 with respect to the reference toner image formed under the above-mentioned reference toner image forming condition, similarly to that of the first preferred embodiment. In the present preferred embodiment, the desirable adhering toner amount is 1 mg/cm$^2$, and there is shown in Table 4 the setting developing voltage $\Delta V_d$ at that time.

As shown in Tables 4 to 7, a difference $\Delta V_G$ between the adjacent grid voltages $V_G$ when the fog removal level LBK is changed in the case of the same developing bias voltage $V_B$ is set to a relatively low value of 20 V in an application of a relatively low developing bias voltage $V_B$, and is gradually increased in an order of 30 V and 40 V in an application of a relatively high developing bias voltage $V_B$. The reason why the difference $\Delta V_G$ is changed every developing bias voltage $V_B$ is as follows. The levels of decreases in the surface electric potential Vo after the endurance limit of the photoconductive drum 41 in the relatively high and low grid voltages $V_G$ are different from each other as shown in FIG. 18. Therefore, it is taken into consideration that decrease in the surface electric potential Vo becomes larger as the developing bias voltage $V_B$ and the grid voltage $V_G$ become larger.

The detection values of the AIDC sensor 210 correspond to the density detection levels LBA in a range from zero to 11 as shown in Tables 4 to 7. Depending on the respective density detection levels LBA, the developing bias voltage $V_B$ is changed from 280 V to 710 V, and also the grid voltage $V_G$ is changed from 500 V to 1000 V. Further, in the case where the grid voltage $V_G$ is not set to the maximum value of 1000 V, when a fog is caused due to lowering of the surface electric potential Vo, the fog removal level LBA is changed from zero to one, two or three using the fog input switch 214, thereby set the grid voltage $V_G$ to be heightened, resulting in removing the fog and obtaining a desirable gradation characteristic.

Further, in the present preferred embodiment, in the case where the density detection level LBA is eleven and the grid voltage $V_G$ is set to the maximum value (1000 V) of the adjustable range thereof, when a fog is caused due to lowering of the surface electric potential Vo on the photoconductive drum 41, the fog removal level LBK is changed from zero to one, two or three, thereby altering the γ correction table from T111 to T112, T113 or T115, resulting in removing the fog and obtaining a desirable gradation characteristic. In the case where the density detection level LBA is ten, the fog removal level LBK is set to two and the grid voltage $V_G$ is set to the maximum value, when a fog is caused due to lowering of the surface electric potential Vo on the photoconductive drum 41, the fog removal level LBK is changed from two to three, thereby altering the γ correction table from T110 to T114, resulting in removing the fog and obtaining a desirable gradation characteristic.

Namely, in the present preferred embodiment, data of the twelve γ correction tables T100 to T111 corresponding to the density detection levels LBA from zero to eleven in the case of the fog removal level LBK of zero are previously stored in the data ROM 203, and data of the other four γ correction tables T112 to T115 are previously stored in the data ROM 203 in order to prevent a fog which may be caused when the grid voltage $V_G$ is set the maximum value of the adjustable range thereof.

For example, as shown in the second quadrant of FIG. 20, when the surface electric potential Vo on the photoconductive drum 41 is lowered so that the image reproduction density to light amount characteristic becomes a characteristic curve 372, the fog removal level LBK is changed from zero to one using the fog input switch 214. In this case, the γ correction process is performed using the γ correction table T112, resulting in obtaining an image reproduction characteristic shown in the first quadrant of FIG. 20.

The image density control process of the second preferred embodiment according to the present invention in the digital full color copying apparatus will be described below.

In the electrophotographic process of reversal development type of the present preferred embodiment, the image reproduction density is automatically controlled in accordance with the grid voltage $V_G$ and the developing bias voltage $V_B$, in a manner similar to that of the conventional apparatus.

On the other hand, the adhering toner amount onto the photoconductive drum 41 upon a predetermined exposure level EXL is detected by the AIDC sensor 210. In the present preferred embodiment, a condition of a grid voltage $V_G$ of 600 V, a developing bias voltage $V_B$ of 400 V and an exposure level EXL of 120 is referred to as a reference toner image forming condition hereinafter. In this case, the surface electric potential $V_I$ after the exposure of a beam of laser light is set to 300 V, and then, the developing voltage $\Delta V=|V_B-V_I|$ becomes 100 V. Under the above-mentioned reference toner image forming condition, a reference toner image which become a reference for the image density control process is formed on the photoconductive drum 41, and then, a regular reflected light and a scattering reflected light from the reference toner image are detected by the AIDC sensor 210 provided in the vicinity of the photoconductive drum 41. Respective detection signals of the regular reflected light and the scattering reflected light are inputted from the AIDC sensor 210 to the printer controller 201, and then, the printer controller 201 calculates an adhering toner amount based on a difference between the inputted respective detection signals.

Thereafter, the adhering toner amount at the maximum image reproduction density level is kept constant by changing a combination of the surface electric potential Vo on the photoconductive drum 41 or the grid voltage $V_G$ and the developing bias voltage $V_B$ depending on the detection value of the adhering toner amount. If a fog is caused, the fog removal level LBK is changed using the fog input switch 214, thereby setting the grid voltage $V_G$ to be heightened or altering the γ correction table. Therefore, the automatic image density control process can be performed so as to remove the fog and to obtain a desirable gradation characteristic.

For example, when the electric charge amount of toner changes due to change in circumstances such as the relative humidity, the maximum image reproduction density can be automatically kept constant by the changing the grid voltage $V_G$ and the developing bias voltage $V_B$. Further, if the fog is caused, the automatic image density control process is performed so as to obtain a desirable gradation characteristic by setting the grid voltage $V_G$ to be heightened or altering the γ correction table.

The control flow of printing process in the printer controller 201 of the second preferred embodiment will be described with reference to a flow chart shown in FIG. 23.

In the first place, after the printer controller 201 is initialized thereinside in step S101, there is performed an input process of the operation panel 221 in step S102. Thereafter, it is detected in step S103 whether or not a print switch (not shown) of the operation panel 221 is turned on. When the print switch is not turned on (NO in step S103), the program flow goes back to step S102, and then, the printer controller 201 becomes a stand-by state until the print switch is turned on.

On the other hand, when the print switch is turned on (YES in step S103), the program flow goes to step S104, and then, there is performed a sensor input process for inputting data detected by various kinds of sensors to the printer controller 201 and storing them in a RAM provided in the printer controller 201. Thereafter, the program flow goes to step S105, and then, there is performed a switch input process for inputting data outputted from various kinds of switches to the printer controller 201 and storing them in the ROM of the printer controller 201. In the next step S106, an AIDC process is carried out. In the AIDC process, the grid voltage $V_G$ and the developing bias voltage $V_B$ are set to respective predetermined standard values, and then, a predetermined detection image pattern is formed on the photoconductive drum 41. Thereafter, the predetermined detection image pattern is developed using toner so as to form the reference toner image thereon. An image reproduction density corresponding to an adhering toner amount of the reference toner image is measured by the AIDC sensor 211, and then, data thereof are stored in the RAM of the printer controller 201.

In step S107, there is performed a γ correction table selection process for selecting a γ correction table among the plural γ correction tables. In the γ correction table selection process, upon performing the copying process for cyan image, a fog removal level LBKC of cyan is set as the fog removal level LBK, and then, upon performing the copying process for magenta image, a fog removal level LBKM of magenta is set as the fog removal level LBK. Thereafter, upon performing the copying process for yellow image, a fog removal level LBKY of yellow is set as the fog removal level LBK, and then, upon performing the copying process for black image, a fog removal level LBKK of black is set as the fog removal level LBK. Further, a grid voltage $V_G$, a developing bias voltage $V_B$, and a γ correction table (one of the 16 γ correction tables T100 to T115) are selected from Tables 4 to 7 on the basis of the density detection level LBA corresponding to the adhering toner amount detected in the AIDC process, and the fog removal level LBK. Thereafter, the copying process known to those skilled in the art is performed in step S108 based on the selected grid voltage $V_G$, the selected developing bias voltage $V_B$, and the selected γ correction table.

Thereafter, it is checked in step S109 whether or not the copying process is completed. If the copying process is completed (YES in step S109), the program flow returns to step S102. On the other hand, if the copying process is not completed (NO in step S109), the program flow returns to step S107.

Figure 23:
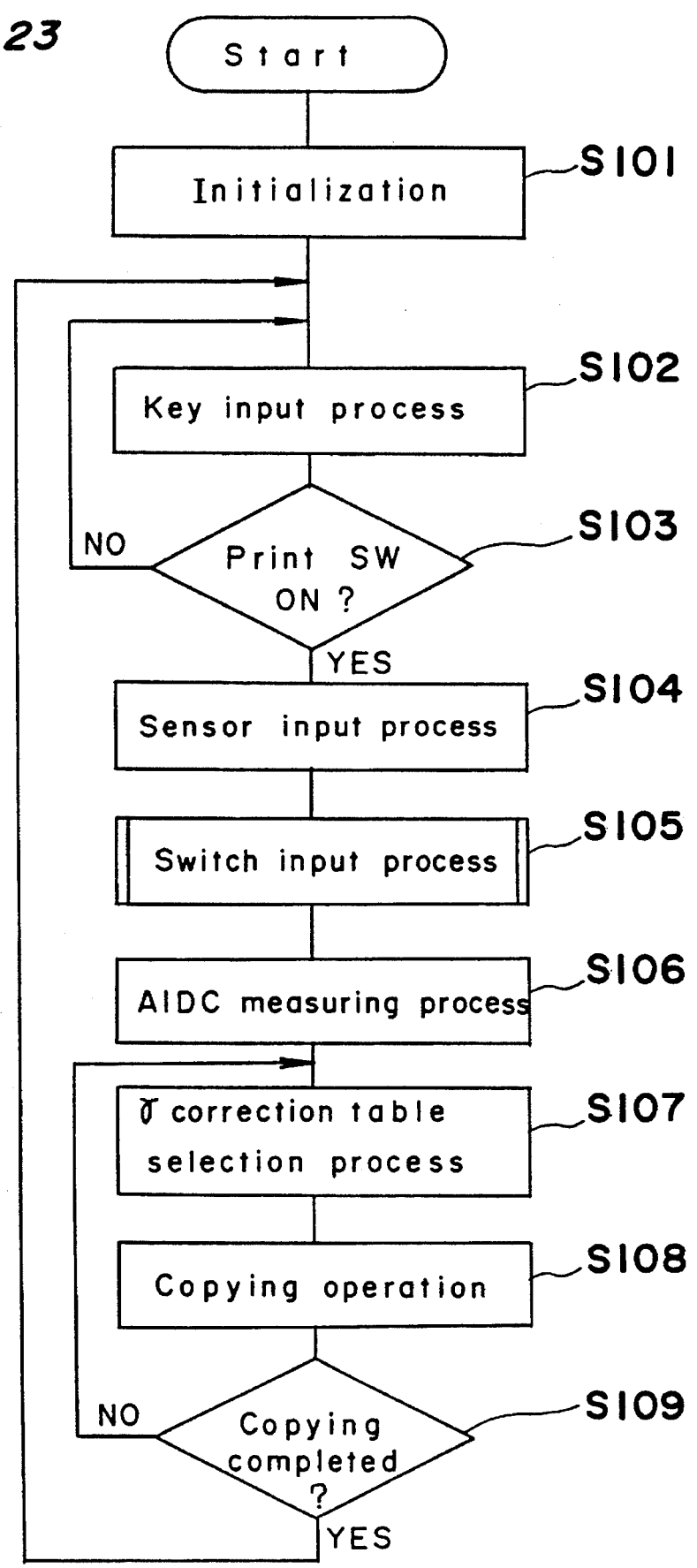
FIG. 23 is a flow chart of a control flow executed by a printer controller of the second preferred embodiment.
Figure 24:
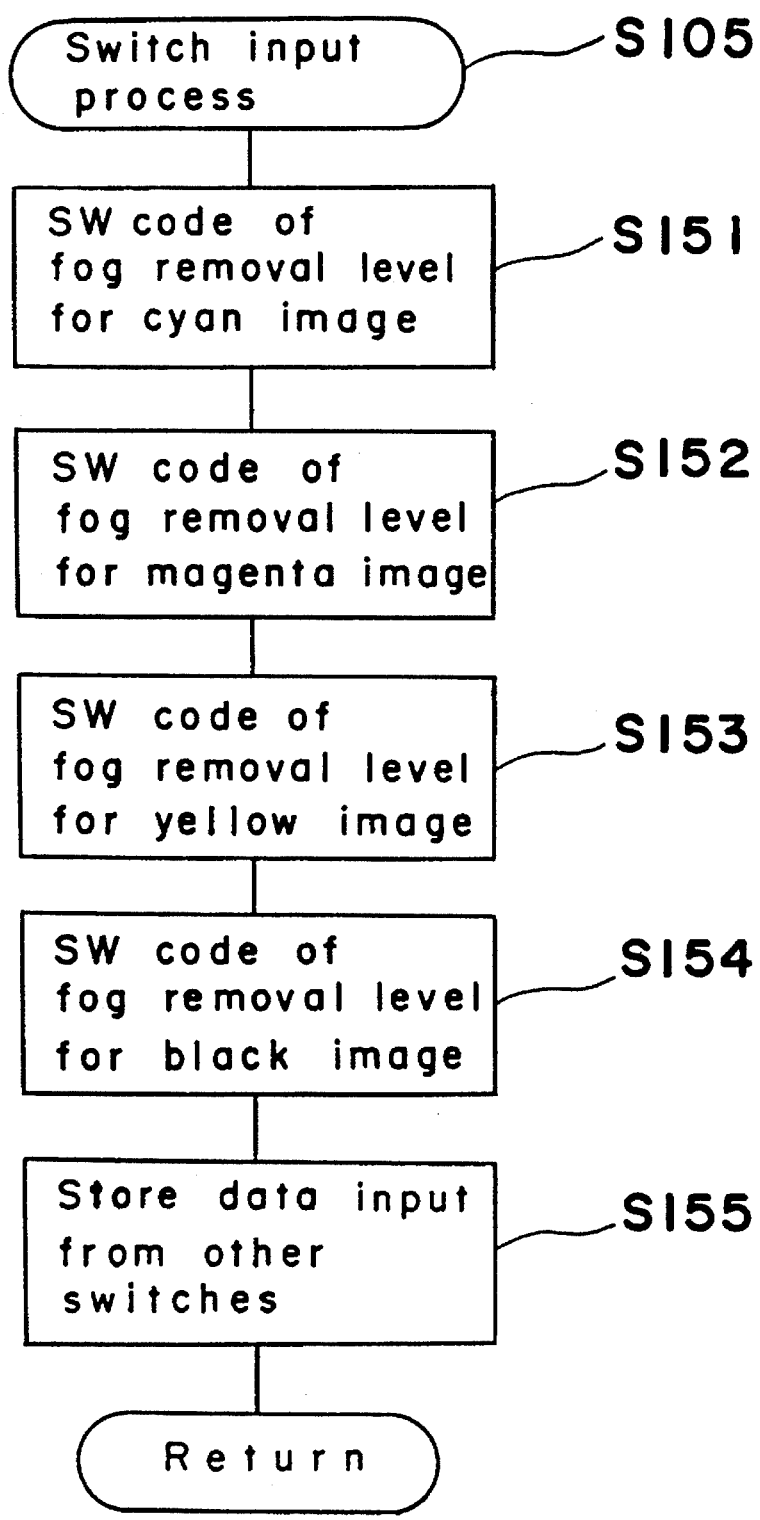
FIG. 24 is a flow chart of a switch input process of a subroutine shown in FIG. 23.

FIG. 24 is a flow chart of the switch input process (step S105) of a subroutine shown in FIG. 23.

Referring to FIG. 24, first of all, in steps S151 to S155, data of switch codes of the fog removal levels of cyan (C), magenta (M), yellow (Y) and black (K) are inputted from the fog input switches 214 of the respective colors, and then, are stored as the fog removal levels LBKC, LBKM, LBKY and LBKK in the RAM of the printer controller 201. Thereafter, in step S155, data outputted from the other switches are inputted to the printer controller 201, an then, are stored in the ROM thereof. Further, the program flow goes back to the original main routine.

In the above-mentioned second preferred embodiment, after the operator of the user sees a reproduced image, the fog removal level can be set in four steps using the fog input switch 214. However, the present invention is not limited to this, and the fog removal level may be automatically set as follows. In this case, the digital full color copying apparatus can be improved so that the operation thereof becomes easier.

In the modification of the second preferred embodiment, the fog removal level LBK is automatically set in four steps from zero to three by detecting a amount of a fog (referred to as a fog amount hereinafter) formed by each of the developing devices 45a to 45d using the AIDC sensor 210, and then, the grid voltage $V_G$ for removing the fog is automatically selected.

The following fog amount detection process is performed simultaneously when the adhering toner amount of the reference toner image is detected by the AIDC sensor 210. After a beam of laser light having an extremely small light amount such as a minimum light amount of the semiconductor laser diode 264 is projected onto an area on the photoconductive drum 41 other than the area where the reference toner image is to be formed in order to detect the AIDC level so as to form an electrostatic latent image thereon, the electrostatic latent image is developed with toner so as to form a second reference toner image on the photoconductive drum 41. Then, a detection value $V_{AIDC}$ of the AIDC sensor 210 is obtained by detecting the adhering toner density of the second reference toner image.

Figure 25:
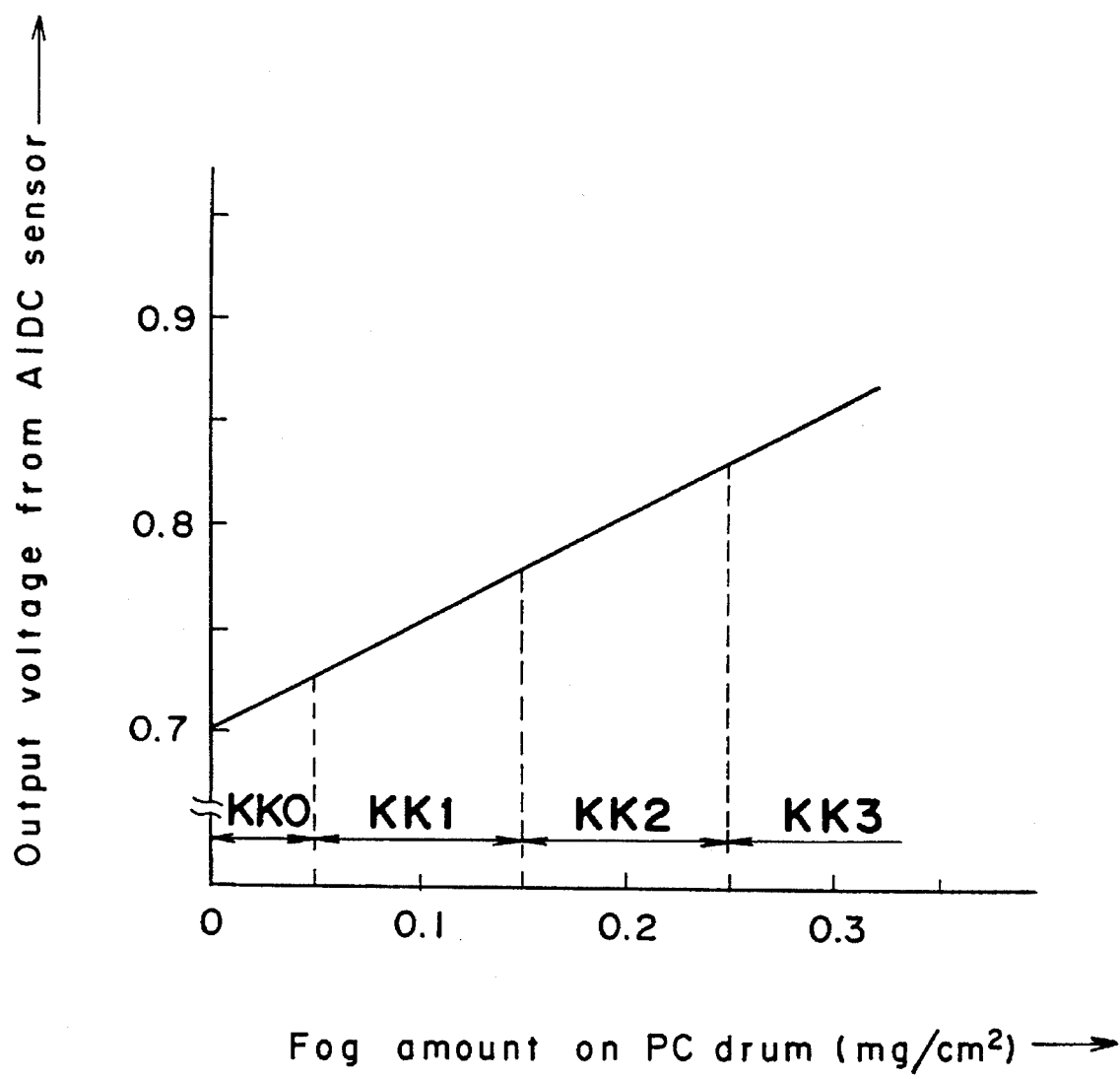
FIG. 25 is a graph of an output voltage of the AIDC sensor to fog amount showing how to set a fog removal level in an automatic fog removal process of a modification of the second preferred embodiment.

For example, as shown in FIG. 25, it is known to those skilled in the art that the detection value $V_{AIDC}$ changes depending on the fog amount on the photoconductive drum 41. In the modification of the second preferred embodiment, as shown in FIG. 25, the detection value of the adhering toner amount is divided into four intervals KK0 to KK3 corresponding to the respective fog removal levels LBK from zero to three. In this case, the fog removal level LBK can be automatically set based on the detection value $V_{AIDC}$ every color.

In the modification of the second preferred embodiment, the AIDC sensor 210 is effectively used for the above-mentioned two uses, the fog can be automatically removed and also the gradation characteristic can be automatically kept constant, resulting in stably reproducing an image having a good quality. Further, the life of the photoconductive drum 41 etc. can be lengthened by performing the above-mentioned fog removal process, thereby reducing the running cost the digital full color copying apparatus.

As described above, according to the present preferred embodiment, upon performing the image density control process, in the case where the grid voltage $V_G$ is set to the maximum value of the adjustable range thereof by the image density control process and the fog can not be removed, the gradation correction data or the γ correction table is altered depending on the selected fog removal level, thereby removing the fog, and also stably printing an image having a predetermined gradation characteristic.

THIRD PREFERRED EMBODIMENT

A digital full color copying apparatus of the a third preferred embodiment according to the present invention will be described below. It is to be noted that the digital full color copying apparatus of the third preferred embodiment has the same composition of that of the first preferred embodiment shown in FIGS. 1 to 4.

The features of the digital full color copying apparatus of the third preferred embodiment are as follows. Upon performing the image density control process for automatically adjusting the image reproduction density, in order to prevent any pseudo contour and any fog, in stead of using a conventional γ correction characteristic T206 shown in FIG. 26 always having a relatively large gradient in a range of the exposure level smaller than the reproduction start light amount a, there is used a γ correction characteristic T206' of FIG. 28 whose gradient is gradually increased from that at the reproduction start light amount a as the exposure level EXL is changed from the reproduction start light amount to zero.

It is generally considered that the pseudo contour is caused due to the γ correction characteristic as described in detail later, and also the fog may be formed by not only lowering of the surface electric potential Vo prior to an exposure of a beam of laser light which is caused due to deterioration of the photoconductor characteristic of the photoconductive drum 41 but also deterioration of the developer. In order to prevent any fog which may be caused due to the deterioration of the photoconductor characteristic of the photoconductive drum 41, conventionally, there is used a method of heightening the grid voltage $V_G$ so as to set the surface electric potential Vo to that in the initial state. However, in order to prevent any fog which may be caused due to the deterioration of the developer, even if the grid voltage $V_G$ is heightened, it is known to those skilled in the art that the effects of removing the fog are relatively small. In order to completely prevent any fog, it is necessary to exchange the developer with new one.

Figure 26:
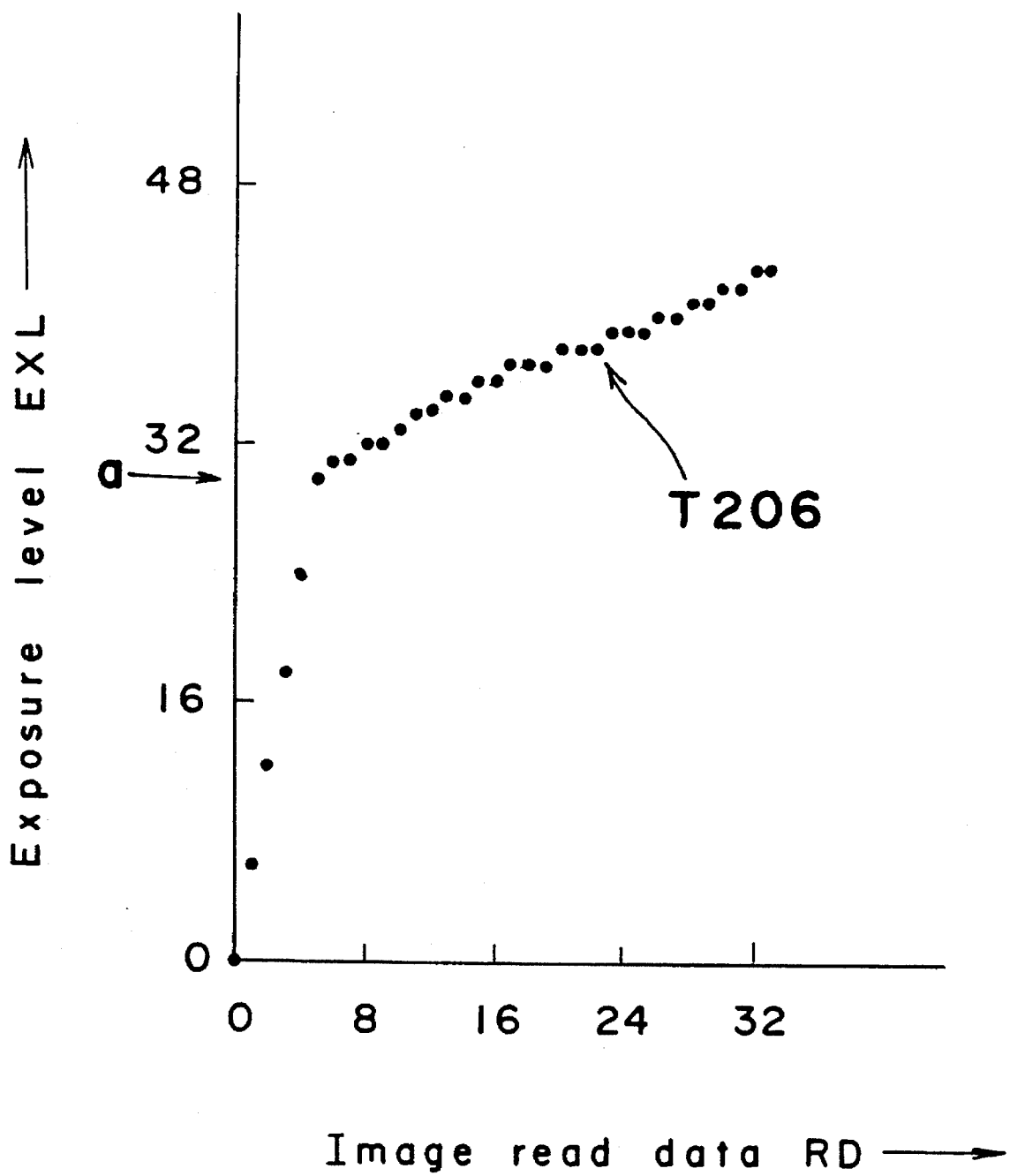
FIG. 26 is an enlarged graph of a low density portion of a γ correction characteristic of the conventional digital full color copying apparatus.

FIG. 26 is an enlarged graph showing a low density portion of a conventional γ correction characteristic T206. As is apparent from FIG. 26, the conventional γ correction characteristic T206 has such a characteristic that the exposure level EXL steeply increases with a relatively large gradient from zero to the reproduction start light amount a as the image read data RD becomes larger and thereafter the exposure level EXL gradually increases from the reproduction start light amount. The reproduction start light amount is defined as an exposure level when an image is first reproduced when the exposure level EXL is increased from zero. However, in the case of performing the γ correction process using the conventional γ correction characteristic T206, there is such a problem that the above-mentioned reproduction start light mount changes due to change in the surface electric potential Vo on the photoconductive drum 41, change in the developing bias voltage $V_B$, change in the photoconductor characteristic of the photoconductive drum 41 or the like, resulting in large change in the image reproduction characteristic.

Figure 27:
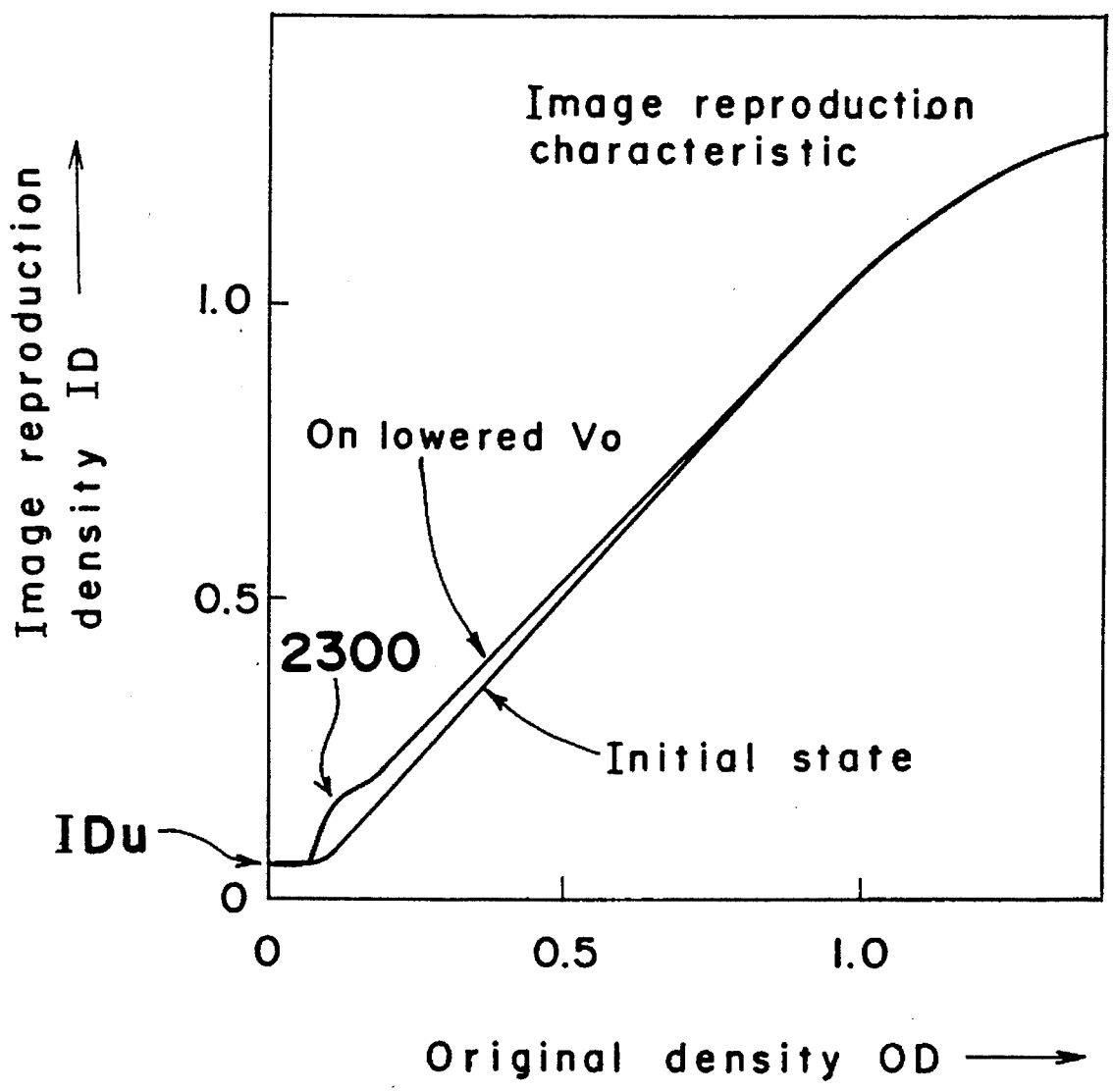
FIG. 27 is a graph of an image reproduction characteristic when there is lowered a surface electric potential Vo on the photoconductive drum from that in the initial state in the conventional digital full color copying apparatus.

In particular, when the surface electric potential Vo decreases and then the reproduction start light amount a becomes smaller, there is reproduced a high light portion with a reproduction image density larger than an original density of an original image as shown in a characteristic curve 2300 of FIG. 27. In particular, when a full color image is reproduced, a turbidity is reproduced on a background of a copying paper, resulting in a fog. As shown in FIG. 26, in a characteristic portion steeply increasing having a relatively large gradient in a high light portion of the γ correction characteristic T206, differences between respective adjacent exposure levels EXL are relatively large and a number of gradations are relatively small, resulting in the above-mentioned pseudo contour.

Accordingly, the object of the third preferred embodiment is to provide the digital full color copying apparatus capable of preventing not only any pseudo contour but also any fog which may be caused in a low density portion when the surface electric potential Vo on the photoconductive drum 41 is lowered, thereby always reproducing an image having a predetermined gradation reproducibility for an original using a gradation characteristic better than that of the conventional apparatus.

Figure 28:
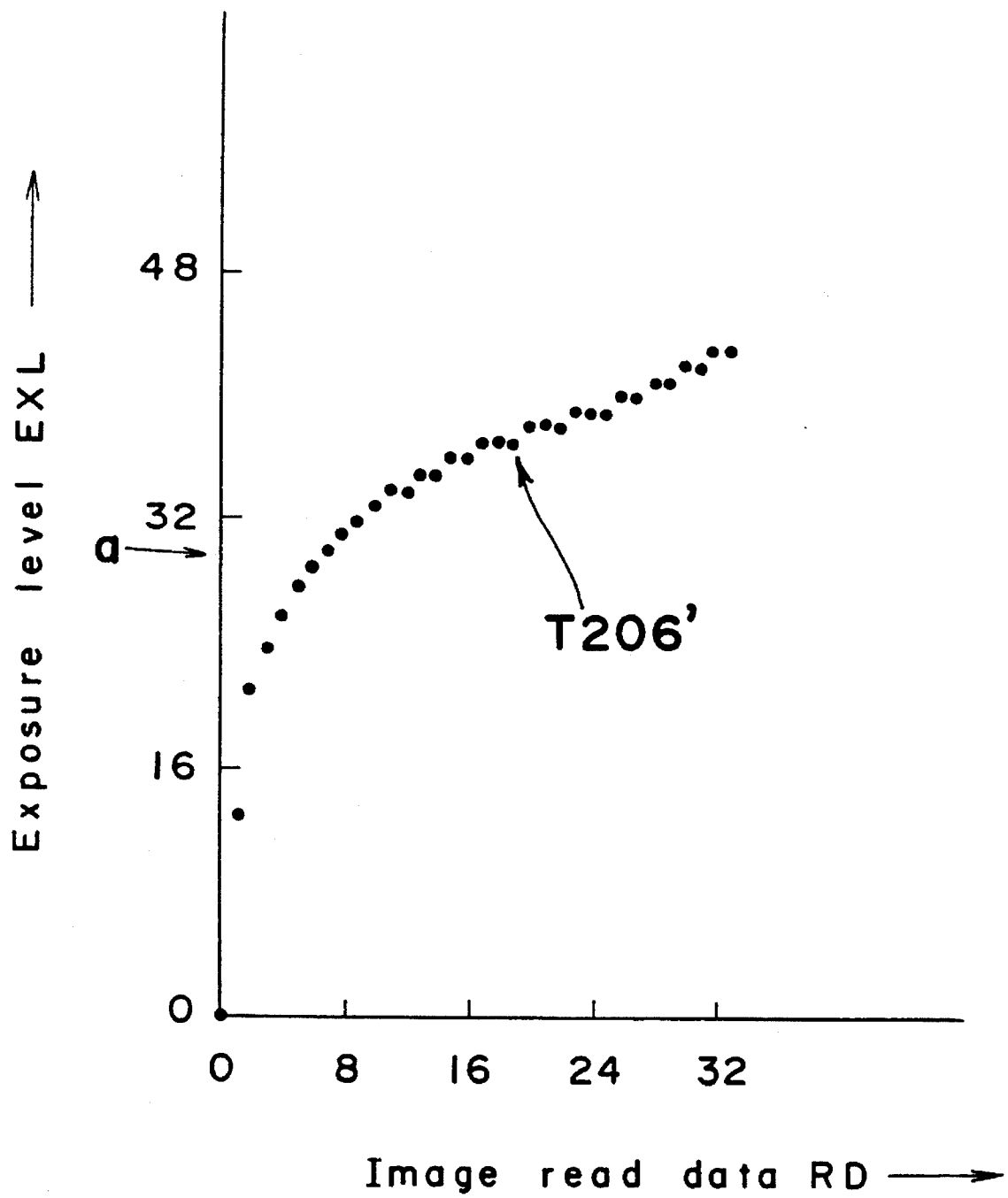
FIG. 28 is an enlarged graph of a low density portion of an improved γ correction characteristic of a digital full color copying apparatus of a third preferred embodiment.

FIG. 28 shows an improved γ correction characteristic T206' according to the present preferred embodiment.

In the conventional apparatus, the γ correction characteristic always has a relatively large gradient in a range of the exposure level EXL smaller than the reproduction start light amount a, as shown in FIG. 26. On the other hand, as shown in FIG. 28, the digital full color copying apparatus according to the third preferred embodiment is characterized in using the γ correction characteristic T206' having an improved characteristic curve in a low density so that the gradient thereof is gradually increased from that at the reproduction start light amount a as the exposure level EXL is changed from the reproduction start light amount a to zero, or so that the γ correction characteristic gradually changes in a range of the exposure level EXL smaller than the reproduction start light amount a.

Figure 30:
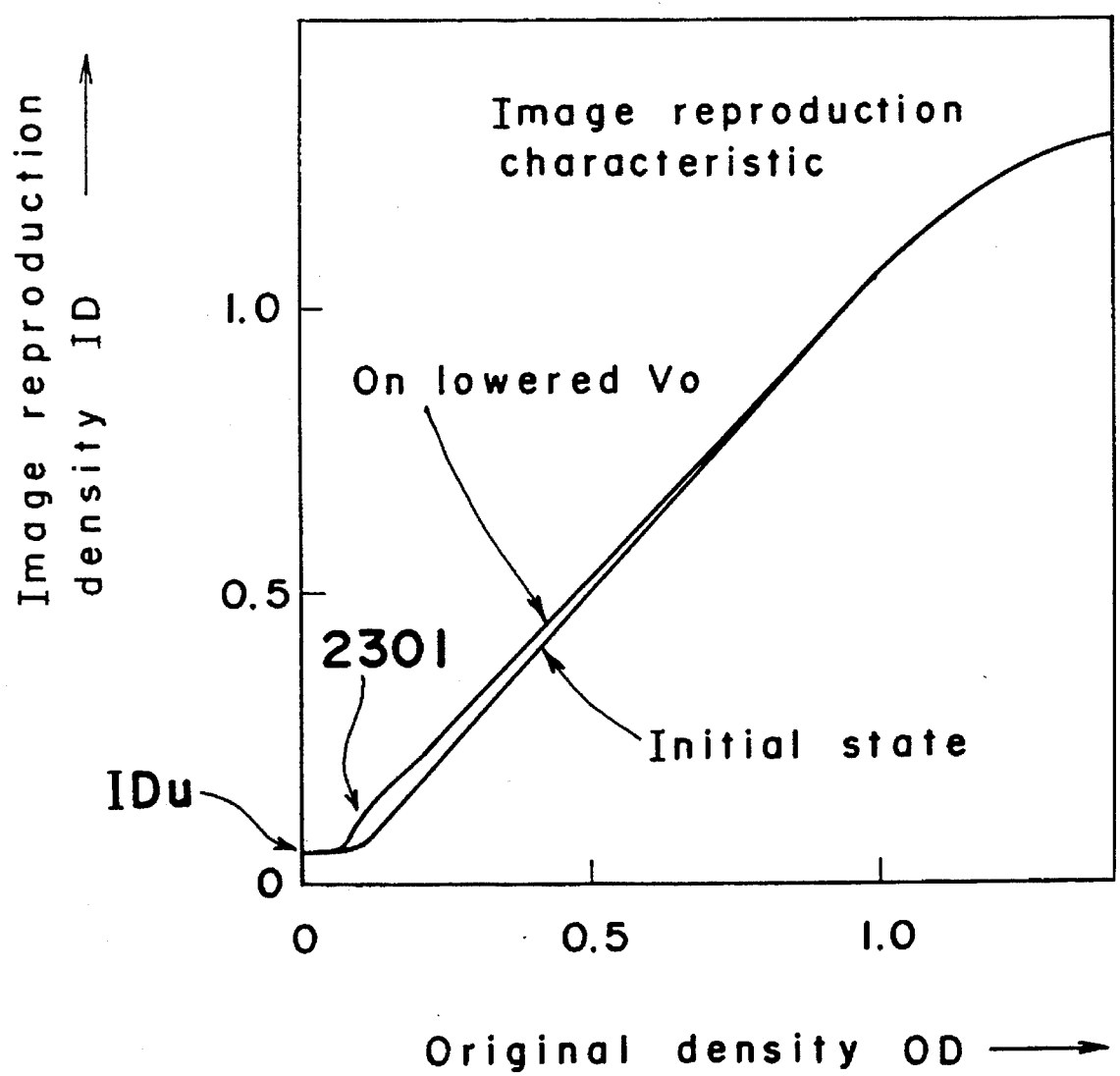
FIG. 30 is a graph of an image reproduction characteristic when there is lowered a surface electric potential Vo on the photoconductive drum from that in the initial state in the digital full color copying apparatus of the third preferred embodiment.

FIG. 30 shows an image reproduction characteristic when the γ correction process is performed using the improved γ correction characteristic T206'. As is apparent from FIG. 30, change in gradation is set to a relatively small value as the surface electric potential Vo is changed in a low density portion, and then, any pseudo can be completely prevented and also any fog can be removed.

Figure 29:
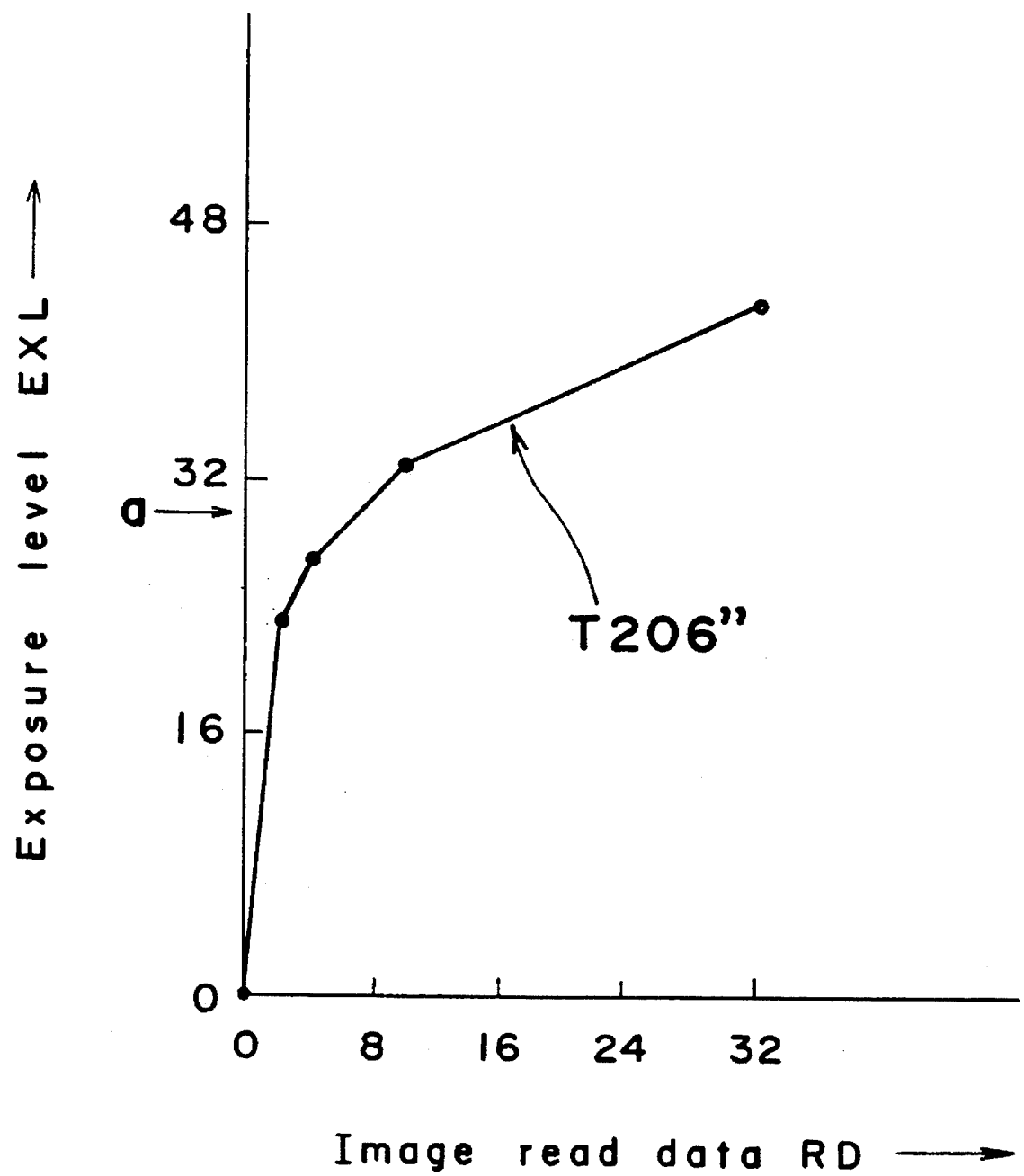
FIG. 29 is an enlarged graph of a low density portion of another improved γ correction characteristic of a modification of the third preferred embodiment.

In stead of using the γ correction characteristic T206' shown in FIG. 28, there may be used a polygonal line characteristic T206" shown in FIG. 29 which is obtained by performing an approximation process with a polygonal line for the γ correction characteristic T206' so that the polygonal line is folded at several inflection points. In this case, there are stored only data of the γ correction characteristic at the inflection points in the data ROM 203, and the γ correction process for the image read data RD positioned between the inflection points is performed by calculating the exposure level EXL using an approximation process based on a straight line connected between the adjacent inflection points. Therefore, data of the γ correction process to be stored in the data ROM 203 can be reduced in the modification of the third preferred embodiment.

THE OTHER PREFERRED EMBODIMENTS

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Density detection level LBA | Detected adhering toner amount [mg/cm²] | Developing efficiency | Setting developing voltage ΔVd [V] |
|---|---|---|---|
| 0 | 0.720 | 0.00720 | 160 |
| 1 | 0.670 | 0.00670 | 160 |
| 2 | 0.625 | 0.00625 | 160 |
| 3 | 0.510 | 0.00510 | 195 |
| 4 | 0.455 | 0.00455 | 220 |
| 5 | 0.410 | 0.00410 | 245 |
| 6 | 0.385 | 0.00385 | 260 |
| 7 | 0.345 | 0.00345 | 290 |
| 8 | 0.310 | 0.00310 | 320 |
| 9 | 0.280 | 0.00280 | 355 |

TABLE 1-continued

| Density detection level LBA | Detected adhering toner amount [mg/cm²] | Developing efficiency | Setting developing voltage ΔVd [V] |
|---|---|---|---|
| 10 | 0.260 | 0.00260 | 385 |
| 11 | 0.240 | 0.00240 | 420 |
| 12 | 0.210 | 0.00210 | 480 |
| 13 | 0.180 | 0.00180 | 560 |
| 14 | 0.160 | 0.00160 | 560 |
| 15 | 0.140 | 0.00140 | 560 |

TABLE 2

| Density detection level LBA | Grid voltage $V_G$ [V] | Surface electric potential $V_o$ [V] | Developing bias voltage $V_B$ [V] |
|---|---|---|---|
| 0 | 500 | 480 | 280 |
| 1 | 500 | 480 | 280 |
| 2 | 500 | 480 | 280 |
| 3 | 540 | 520 | 320 |
| 4 | 570 | 545 | 345 |
| 5 | 600 | 570 | 370 |
| 6 | 630 | 590 | 390 |
| 7 | 660 | 620 | 420 |
| 8 | 700 | 650 | 450 |
| 9 | 740 | 690 | 490 |
| 10 | 780 | 720 | 520 |
| 11 | 830 | 760 | 560 |
| 12 | 900 | 820 | 620 |
| 13 | 1000 | 910 | 710 |
| 14 | 1000 | 910 | 710 |
| 15 | 1000 | 910 | 710 |

TABLE 3

| Density detection level LBA | $V_{Im}$ [V] | γ correction table |
|---|---|---|
| 0 | 120 | T100b |
| 1 | 120 | T100a |
| 2 | 120 | T100 |
| 3 | 125 | T101 |
| 4 | 125 | T102 |
| 5 | 125 | T103 |
| 6 | 130 | T104 |
| 7 | 130 | T105 |
| 8 | 130 | T106 |
| 9 | 135 | T107 |
| 10 | 135 | T108 |
| 11 | 140 | T109 |
| 12 | 140 | T110 |
| 13 | 150 | T111 |
| 14 | 150 | T111a |
| 15 | 150 | T111b |

TABLE 4

| Density detection level LBA | Detected adhering toner amount [mg/cm²] | Developing efficiency | Setting developing voltage ΔVd [V] |
|---|---|---|---|
| 0 | 0.625 | 0.00625 | 160 |
| 1 | 0.510 | 0.00510 | 195 |
| 2 | 0.455 | 0.00455 | 220 |
| 3 | 0.410 | 0.00410 | 245 |
| 4 | 0.385 | 0.00385 | 260 |
| 5 | 0.345 | 0.00345 | 290 |
| 6 | 0.310 | 0.00310 | 320 |
| 7 | 0.280 | 0.00280 | 355 |

TABLE 4-continued

| Density detection level LBA | Detected adhering toner amount [mg/cm$^2$] | Developing efficiency | Setting developing voltage $\Delta Vd$ [V] |
|---|---|---|---|
| 8 | 0.260 | 0.00260 | 385 |
| 9 | 0.240 | 0.00240 | 420 |
| 10 | 0.210 | 0.00210 | 480 |
| 11 | 0.180 | 0.00180 | 560 |

TABLE 5

| Density detection level LBA | Surface electric potential Vo [V] | Developing bias voltage $V_B$ [V] |
|---|---|---|
| 0 | 480 | 280 |
| 1 | 520 | 320 |
| 2 | 545 | 345 |
| 3 | 570 | 370 |
| 4 | 590 | 390 |
| 5 | 620 | 420 |
| 6 | 650 | 450 |
| 7 | 690 | 490 |
| 8 | 720 | 520 |
| 9 | 760 | 560 |
| 10 | 820 | 620 |
| 11 | 910 | 710 |

TABLE 6

| Density detection level LBA | Fog removal level LBK = 0 | | Fog removal level LBK = 1 | |
|---|---|---|---|---|
| | $V_G$ [V] | γ correction table | $V_G$ [V] | γ correction table |
| 0 | 500 | T100 | 520 | T100 |
| 1 | 540 | T101 | 570 | T101 |
| 2 | 570 | T102 | 600 | T102 |
| 3 | 600 | T103 | 630 | T103 |
| 4 | 630 | T104 | 660 | T104 |
| 5 | 660 | T105 | 700 | T105 |
| 6 | 700 | T106 | 740 | T106 |
| 7 | 740 | T107 | 780 | T107 |
| 8 | 780 | T108 | 820 | T108 |
| 9 | 830 | T109 | 860 | T109 |
| 10 | 900 | T110 | 950 | T110 |
| 11 | 1000 | T111 | 1000 | T112 |

TABLE 7

| Density detection level LBA | Fog removal level LBK = 2 | | Fog removal level LBK = 3 | |
|---|---|---|---|---|
| | $V_G$ [V] | γ correction table | $V_G$ [V] | γ correction table |
| 0 | 540 | T100 | 570 | T100 |
| 1 | 600 | T101 | 630 | T101 |
| 2 | 630 | T102 | 660 | T102 |
| 3 | 660 | T103 | 700 | T103 |
| 4 | 700 | T104 | 740 | T104 |
| 5 | 740 | T105 | 780 | T105 |
| 6 | 780 | T106 | 820 | T106 |
| 7 | 820 | T107 | 860 | T107 |
| 8 | 860 | T108 | 900 | T108 |
| 9 | 900 | T109 | 950 | T109 |
| 10 | 1000 | T110 | 1000 | T114 |
| 11 | 1000 | T113 | 1000 | T115 |

What is claimed is:

1. An electrophotographic image forming apparatus comprising:

a photoconductor;

charger means for electrically charging said photoconductor to a predetermined initial electric potential, thereby supplying an electric charge corresponding to said initial electric potential thereto;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

charger control means for controlling said charger means based on a detection result of said detection means so as to change said initial electric potential of said photoconductor;

storage means for storing a plurality of gradation correction data;

selection means for selecting one of the plurality of gradation correction data stored by said storage means based on the detection result of said detection means when said initial electric potential of said photoconductor is at an upper or lower limit value of a predetermined range; and light projecting control means for controlling said light projecting means to change a light amount of the light projected onto said photoconductor by said light projecting means, based on the gradation correction data selected by said selection means, according to an image density signal representing densities of respective pixels of an image to be formed.

2. The apparatus as claimed in claim 1, wherein said light projecting control means controls said light projecting means to change an area of a portion on said photoconductor projected corresponding to each pixel according to the image density signal.

3. The apparatus as claimed in claim 1, wherein said light projecting control means controls said light projecting means to change an intensity of the light projected onto said photoconductor according to the image density signal.

4. The apparatus as claimed in claim 1, wherein said detection means detects an image density of the toner image formed on said photoconductor.

5. The apparatus as claimed in claim 1, further comprising developing bias control means for controlling said voltage applying means to change the developing bias voltage based on the detection result of said detection means.

6. The apparatus as claimed in claim 1, wherein said charger means comprises an electrically charging electrode for supplying an electric charge to said photoconductor; and a grid electrode provided between said charging electrode and said photoconductor, said grid electrode regulating an amount of electric charge supplied from said charging electrode to said photoconductor, and said charger control means controls said charger means to change an electric potential of said grid electrode.

7. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

storage means for storing a plurality of gradation correction data;

gradation control means for controlling said charger means to change an output thereof based on a detection result of said detection means, and for selecting one of the plurality of gradation correction data stored by said storage means based on the output of said charger means;

correction means for correcting an image density signal representing densities of respective pixels of an image to be formed based on the gradation correction data selected by said gradation control means; and light projecting control means for controlling said light projecting means to change a light amount of the light projected onto said photoconductor by said light projecting means according to the image density signal corrected by said correction means;

wherein said gradation control means changes the selected gradation correction data to another gradation correction data while making the output of said charger means constant based on the detection result of said detection means when the output of said charger means is a predetermined value.

8. The apparatus as claimed in claim 7, further comprising toner image forming means for forming a reference toner image on said photoconductor, wherein said detection means detects an image density of the reference toner image formed by said toner image forming means.

9. The apparatus as claimed in claim 7, wherein said gradation control means controls said voltage applying means to change the developing bias voltage based on the detection result of said detection means, and changes the selected gradation correction data to another gradation correction data making the developing bias voltage constant based on the detection result of said detection means when the developing bias voltage is a predetermined value.

10. An electrophotographic image forming apparatus comprising:

a photoconductor;

charger means for electrically charging said photoconductor to a predetermined initial electric potential, thereby supplying an electric charge corresponding to said initial electric potential thereto;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

developing bias voltage control means for controlling said voltage applying means to change the developing bias voltage based on a detection result of said detection means;

storage means for storing a plurality of gradation correction data;

selection means for selecting one of the plurality of gradation correction data stored by said storage means based on the detection result of said detection means when the developing bias voltage is at an upper or lower limit value of a predetermined range; and light projecting control means for controlling said light projecting means to change a light amount of the light projected from said light projecting means onto said photoconductor, based on the gradation correction data selected by said selection means, according to an image density signal representing densities of respective pixels of an image to be formed.

11. The apparatus as claimed in claim 10, wherein said light projecting control means controls said light projecting means to change an area of a portion on said photoconductor projected corresponding to each pixel according to the image density signal.

12. The apparatus as claimed in claim 10, wherein said light projecting control means controls said light projecting means to change an intensity of the light projected onto said photoconductor according to the image density signal.

13. The apparatus as claimed in claim 10, wherein said detection means detects an image density of the toner image formed on said photoconductor.

14. The apparatus as claimed in claim 10, further comprising charger control means for controlling said charger means to change the initial electric potential of said photoconductor based on the detection result of said detection means.

15. The apparatus as claimed in claim 14, wherein said charger means comprises an electrically charging electrode for supplying an electric charge to said photoconductor; and a grid electrode provided between said charging electrode and said photoconductor, said grid electrode regulating an amount of electric charge supplied from said charging electrode to said photoconductor, and said charger control means controls said charger means to change an electric potential of said grid electrode.

16. An electrophotographic image forming apparatus comprising:

a photoconductor;

light projecting means for projecting a light onto said photoconductor so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

storage means for storing a plurality of gradation correction data;

gradation control means for controlling said voltage applying means to change the developing bias voltage based on a detection result of said detection means, and for selecting one of the plurality of gradation correction data based on the developing bias voltage;

correction means for correcting an image density signal representing densities of respective pixels of an image to be formed, based on the gradation correction data selected by said gradation control means; and light projecting control means for controlling said light projecting means to change a light amount of the light projected onto said photoconductor by said light projecting means according to the image density signal corrected by said correction means;

wherein said gradation control means changes the selected gradation correction data to another gradation correction data while making the developing bias voltage constant based on the detection result of said detection means when the developing bias voltage is a predetermined value.

17. The apparatus as claimed in claim 16, further comprising toner image forming means for forming a reference toner image on said photoconductor, wherein said detection means detects an image density of the reference toner image formed by said toner image forming means.

18. A method for adjusting an image density of an image to be reproduced which is provided in an electrophotographic image forming apparatus comprising:

a photoconductor;

charger means for electrically charging said photoconductor to a predetermined initial electric potential;

correction means for correcting an image density signal representing image densities of respective pixels of the image to be reproduced, based on a predetermined gradation correction data;

light projecting means for projecting a light onto said photoconductor electrically charged to said initial electric potential, with a light amount corresponding to the image density signal corrected by said correction means, so as to form an electrostatic latent image on said photoconductor;

developing means for developing the electrostatic latent image with toner so as to form a toner image on said photoconductor; and voltage applying means for applying a developing bias voltage to said developing means;

said method including the following steps of:
controlling said charger means and said voltage applying means to change the output of said charger means and the developing bias voltage, so as to adjust the image density of the image to be reproduced; and changing the predetermined gradation correction data to another gradation correction data while making the output of said charger means and the developing bias voltage constant, when the output of said charger means and the developing bias voltage are set to upper or lower limit values of predetermined adjustable ranges thereof.

19. A method for adjusting an image density of an image to be reproduced which is provided in an electrophotographic image forming apparatus comprising:

a photoconductor;

charger means for electrically charging said photoconductor to a predetermined initial electric potential;

correction means for correcting an image density signal representing image densities of respective pixels of the image to be reproduced, based on a predetermined gradation correction data;

light projecting means for projecting a light onto said photoconductor electrically charged to said initial electric potential, with a light amount corresponding to the image density signal corrected by said correction means, so as to form an electrostatic latent image on said photoconductor;

developing means for developing the electrostatic latent image with toner so as to form a toner image on said photoconductor; and voltage applying means for applying a developing bias voltage to said developing means;

said method including the following steps of:
controlling either one of said charger means and said voltage applying means to change either one of the output of said charger means and the developing bias voltage, respectively, so as to adjust the image density of the image to be reproduced; and changing the predetermined gradation correction data to another gradation correction data while making the output of said charger means and the developing bias voltage constant, when either one of the output of said charger means and the developing bias voltage is set to an upper or lower limit value of a predetermined adjustable range thereof.

20. A method for adjusting an image density of an image to be reproduced which is provided in an electrophotographic image forming apparatus comprising:

a photoconductor;

charger means for electrically charging said photoconductor to a predetermined initial electric potential;

correction means for correcting an image density signal representing image densities of respective pixels of the image to be reproduced, based on a predetermined gradation correction data;

light projecting means for projecting a light onto said photoconductor electrically charged to said initial electric potential, with a light amount corresponding to the image density signal corrected by said correction means, so as to form an electrostatic latent image on said photoconductor;

developing means for developing the electrostatic latent image with toner so as to form a toner image on said photoconductor; and voltage applying means for applying a developing bias voltage to said developing means;

said method including the following steps of:
forming a reference toner image on said photoconductor;

detecting an image density of the reference toner image;

controlling said charger means and said voltage applying means to change the output of said charger means and the developing bias voltage, so as to adjust the image density of the image to be reproduced, based on a result of said detecting step; and changing the predetermined gradation correction data to another gradation correction data while making the output of said charger means and the developing bias voltage constant, when the output of said charger means and the developing bias voltage are respectively set to upper or lower limit values of predetermined adjustable ranges thereof.

21. A method for adjusting an image density of an image to be reproduced which is provided in an electrophotographic image forming apparatus comprising:

a photoconductor;

charger means for electrically charging said photoconductor to a predetermined initial electric potential;

correction means for correcting an image density signal representing image densities of respective pixels of the image to be reproduced, based on a predetermined gradation correction data;

light projecting means for projecting a light onto said photoconductor electrically charged to said initial electric potential, with a light amount corresponding to the image density signal corrected by said correction means, so as to form an electrostatic latent image on said photoconductor;

developing means for developing the electrostatic latent image with toner so as to form a toner image on said photoconductor; and voltage applying means for applying a developing bias voltage to said developing means;

said method including the following steps of:

forming a reference toner image on said photoconductor;

detecting an image density of the reference toner image;

controlling either one of said charger means and said voltage applying means to change either one of the output of said charger means and the developing bias voltage, respectively, so as to adjust the image density of the image to be reproduced, based on a detection result of said detecting step; and changing the predetermined gradation correction data to another gradation correction data while making the output of said charger means and the developing bias voltage constant, when either one of the output of said charger means and the developing bias voltage is set to an upper or lower limit value of a predetermined adjustable range thereof.

22. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

gradation control means for controlling said charger means and said voltage applying means to respectively change the output of said charger means and the developing bias voltage in predetermined ranges based on a detection result of said detection means;

storage means for storing a plurality of gradation correction data;

selection means for selecting one of the plurality of gradation correction data stored by said storage means based on the output of said charger means and the developing bias voltage;

correction means for correcting an image density signal representing image densities of respective pixels of an image to be formed, based on the gradation correction data selected by said selection means; and light projecting control means for controlling said light projecting means to change a light amount of the light projected onto said photoconductor by said light projecting means, according to the image density signal corrected by said correction means;

wherein said selection means selects one of the plurality of gradation correction data stored by said storage means based on a detection result of said detection means when the output of said charger means and the developing bias voltage are respectively set to upper or lower limit values of predetermined ranges thereof.

23. The apparatus as claimed in claim 22, wherein said light projecting control means controls said light projecting means to change an area of a portion on said photoconductor projected corresponding to each pixel according to the image density signal.

24. The apparatus as claimed in claim 22, wherein said light projecting control means controls said light projecting means to change an intensity of the light projected onto said photoconductor according to the image density signal.

25. The apparatus as claimed in claim 22, wherein said detection means detects an image density of the toner image formed on said photoconductor.

26. The apparatus as claimed in claim 22, further comprising further storage means for storing a plurality of combinations of the output of said charger means and the developing bias voltage, wherein said gradation control means selects one of the plurality of combinations stored by said further storage means based on the detection result of said detection means.

27. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

gradation control means for controlling said charger means and said voltage applying means to respectively change the output of said charger means and the developing bias voltage in predetermined ranges;

storage means for storing a plurality of gradation correction data;

selection means for selecting one of the plurality of gradation correction data stored by said storage means based on the output of said charger means and the developing bias voltage;

correction means for correcting an image density signal representing image densities of respective pixels of an image to be formed, based on the gradation correction data selected by said selection means; and light projecting control means for controlling said light projecting means to change a light amount of the light projected onto said photoconductor by said light projecting means, according to the image density signal corrected by said correction means;

wherein said selection means changes the selected gradation correction data to another gradation correction data while making the output of said charger and the developing bias voltage constant, when either one of the output of said charger means and the developing bias voltage is set to an upper or lower limit value of a predetermined range thereof.

28. The apparatus as claimed in claim 27, further comprising operation means manually operable by an operator for adjusting an image density of a low density portion of the image to be formed, wherein said gradation control means controls said charger means to change the output of said charger means making the developing bias voltage constant, based on an operation result of said operation means.

29. The apparatus as claimed in claim 28, further comprising:

toner image forming means for forming a reference toner image on said photoconductor; and detection means for detecting an image density of the reference toner image formed by said toner image forming means, wherein said gradation control means changes a combination of the output of said charger means and the developing bias voltage based on the image density detected by said detection means.

30. The apparatus as claimed in claim 27, further comprising operation means manually operable by an operator for adjusting an image density of a low density portion of the image to be formed, wherein said gradation control means changes a combination of the output of said charger means and the developing bias voltage based on an operation result of said operation means.

31. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

operation means manually operable by an operator for adjusting an image density of an image to be formed;

charger control means for controlling said charger means to change the output of said charger means so as to change said initial electric potential of said photoconductor;

storage means for storing a plurality of gradation correction data;

selection means for selecting one of the plurality of gradation correction data stored by said storage means based on an operation result of said operation means when the output of said charger means is set to an upper or lower limit value of a predetermined adjustable range thereof; and light projecting control means for controlling said light projecting means to change a light amount of the light projected onto said photoconductor by said light projecting means, based on the gradation correction data selected by said selection means, according to an image density signal representing image densities of respective pixels of the image to be formed.

32. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

input means for inputting a fog removal level representing an image density of a low density portion of an image to be formed;

gradation control means for controlling said charger means and said voltage applying means to change the output of said charger means while making the developing bias voltage constant based on the fog removal level inputted by said input means;

storage means for storing a plurality of gradation correction data;

selection means for selecting one of the plurality of gradation correction data stored by said storage means based on the output of said charger means and the developing bias voltage;

correction means for correcting an image density signal representing image densities of respective pixels of the image to be formed, based on the gradation correction data selected by said selection means; and light projecting control means for controlling said light projecting means to change a light amount of the light projected onto said photoconductor by said light projecting means, according to the image density signal corrected by said correction means, wherein said selection means selects one of the plurality of gradation correction data stored by said storage means based on the fog removal level inputted by said input means, when the output of said charger means is set to an upper or lower limit value of a predetermined adjustable range thereof.

33. The apparatus as claimed in claim 32, wherein said charger means comprises an electrically charging electrode for supplying an electric charge to said photoconductor; and a grid electrode provided between said charging electrode and said photoconductor, said grid electrode regulating an amount of electric charge supplied from said charging electrode to said photoconductor, and said gradation control means controls said charger means to change an electric potential of said grid electrode based on the fog removal level inputted by said input means.

34. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting an image density of the toner image formed on said photoconductive drum;

first control means for controlling said charger means and said voltage applying means to change the output of said charger means and the developing bias voltage based on the image density detected by said detection means;

storage means for storing a plurality of gradation correction data;

selection means for selecting one of the plurality of gradation correction data stored by said storage means based on the output of said charger means and the developing bias voltage;

correction means for correcting an image density signal representing image densities of respective pixels of the image to be formed, based on the gradation correction data selected by said selection means;

light projecting control means for controlling said light projecting means to change a light amount of the light projected onto said photoconductor by said light projecting means, according to the image density signal corrected by said correction means;

input means for inputting a fog removal level representing an image density of a low density portion of the image to be formed; and second control means for controlling said charger means and said voltage applying means to change the output of said charger means while making the developing bias voltage constant based on the fog removal level inputted by said input means;

wherein said selection means selects one of the plurality of gradation correction data stored by said storage means based on the fog removal level inputted by said input means, when the output of said charger means is set to an upper or lower limit value of a predetermined adjustable range thereof.

35. An electrophotographic image forming apparatus comprising:

a photoconductor;

charger means for electrically charging said photoconductor to a predetermined initial electric potential;

light projecting means for projecting a light onto said photoconductor electrically charged to said initial electric potential so as to form an electrostatic latent image on said photoconductor; and light projecting control means for controlling said light projecting means to change a light amount of the light projected onto said photoconductor by said light projecting means, according to an image density signal representing image densities of respective pixels of the image to be formed, based on gradation correction data representing a relationship between the light amount of the light projected from said light projecting means onto said photoconductor and the image density signal, said gradation correction data being set so that a value of a ratio of the light amount of the projected light to the image density signal gradually increases from that of a predetermined reproduction start light amount as the projected light amount is changed from the reproduction start light amount to zero, said predetermined reproduction start light amount being the lowest projected light amount by which an image first starts to be reproduced.

* * * * *